United States Patent
Pressnell et al.

(10) Patent No.: US 11,910,071 B2
(45) Date of Patent: *Feb. 20, 2024

(54) PRESENTING MEDIA ITEMS ON A PLAYING DEVICE

(71) Applicant: Penthera Partners, Inc., New York, NY (US)

(72) Inventors: Joshua James Pressnell, Spring Valley, OH (US); Brian Kline, New Providence, NJ (US)

(73) Assignee: PENTHERA PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,268

(22) Filed: Dec. 27, 2022

(65) Prior Publication Data
US 2023/0217085 A1 Jul. 6, 2023

Related U.S. Application Data

(60) Continuation of application No. 17/349,563, filed on Jun. 16, 2021, now Pat. No. 11,546,676, which is a
(Continued)

(51) Int. Cl.
*H04L 65/60* (2022.01)
*H04L 65/612* (2022.01)
(Continued)

(52) U.S. Cl.
CPC ......... *H04N 21/8456* (2013.01); *H04L 65/60* (2013.01); *H04L 65/612* (2022.05);
(Continued)

(58) Field of Classification Search
CPC .......... H04N 21/8456; H04N 21/2181; H04N 21/23106; H04N 21/23439;
(Continued)

(56) References Cited

U.S. PATENT DOCUMENTS 7,876,978 B2  1/2011  Berger et al.
7,999,788 B2  8/2011  Schohn et al.
(Continued)

FOREIGN PATENT DOCUMENTS

KR  10-2009-0056506  6/2009

OTHER PUBLICATIONS

Akamai.com [online], "What does CDN stand for? CDN Definition", published on or before Sep. 11, 2020, retrieved on May 17, 2021, 4 pages.
(Continued)

*Primary Examiner* — Sm A Rahman
(74) *Attorney, Agent, or Firm* — Rothwell, Figg, Ernst & Manbeck, P.C.

(57) ABSTRACT

In general, in an aspect, versions of representations of segments of a media item are received and temporarily stored on a media playing device. The segments have a sequence. The temporarily stored versions are used in sequence to present at least part of the media item to a user. One or more other versions of representations of segments of the media item are also received and persistently stored on the media playing device. The one or more persistently stored other versions are used to enhance the presentation of at least part of the media item to the user.

16 Claims, 9 Drawing Sheets

Figure 1:
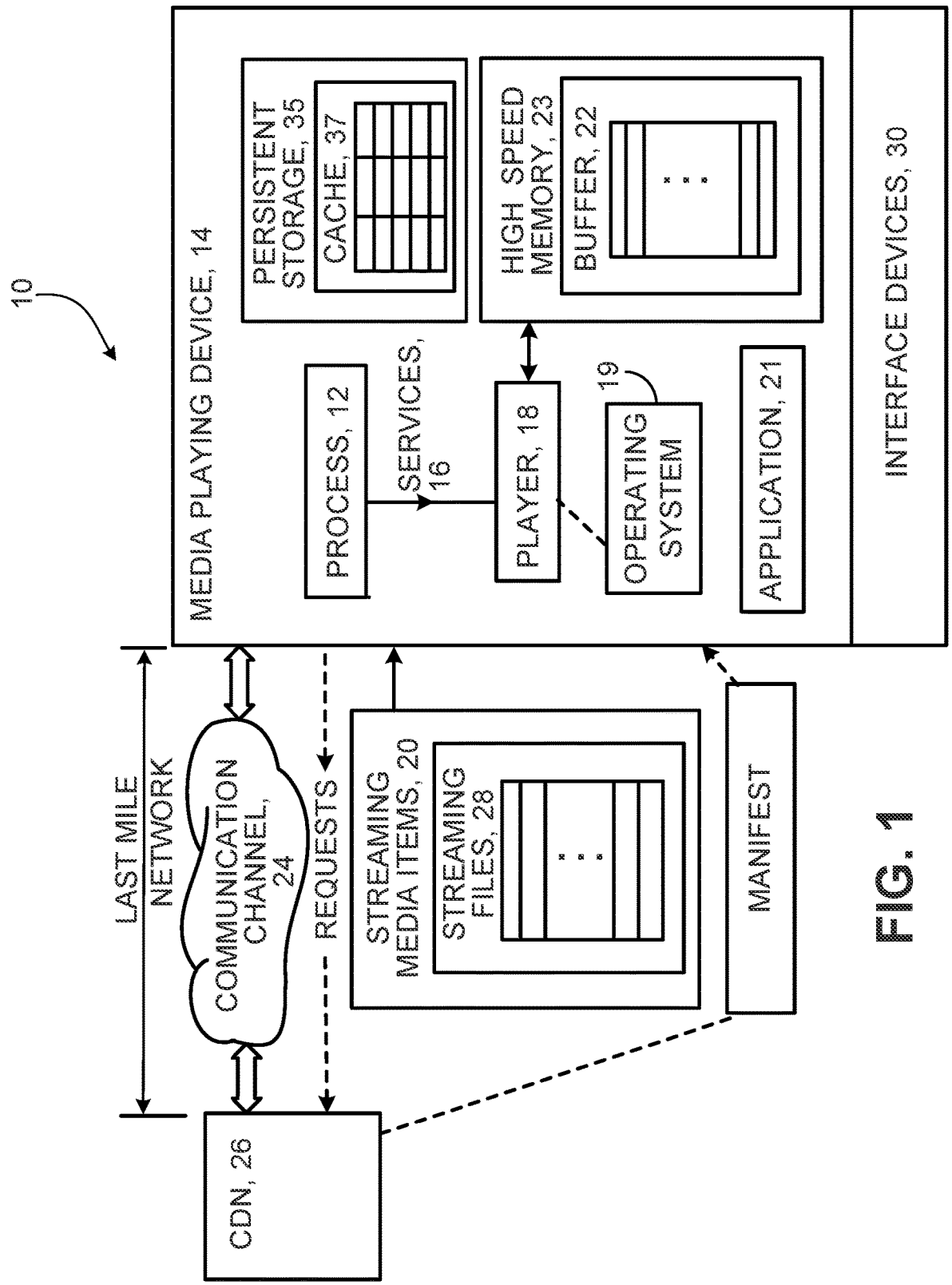

Related U.S. Application Data continuation of application No. 17/151,037, filed on Jan. 15, 2021, now Pat. No. 11,438,673, which is a division of application No. 17/018,836, filed on Sep. 11, 2020, now abandoned.

(51) Int. Cl.

| | | |
|---|---|---|
| H04L 65/80 | (2022.01) | |
| H04N 21/845 | (2011.01) | |
| H04N 21/262 | (2011.01) | |
| H04N 21/2343 | (2011.01) | |
| H04L 67/02 | (2022.01) | |
| H04N 21/218 | (2011.01) | |
| H04N 21/231 | (2011.01) | |
| H04N 21/235 | (2011.01) | |
| H04N 21/238 | (2011.01) | |
| H04N 21/458 | (2011.01) | |
| H04N 21/61 | (2011.01) | |
| H04N 21/6332 | (2011.01) | |
| H04N 21/6377 | (2011.01) | |
| H04N 21/647 | (2011.01) | |

(52) U.S. Cl.
CPC .............. *H04L 65/80* (2013.01); *H04L 67/02* (2013.01); *H04N 21/2181* (2013.01); *H04N 21/2358* (2013.01); *H04N 21/23106* (2013.01); *H04N 21/23439* (2013.01); *H04N 21/23805* (2013.01); *H04N 21/26258* (2013.01); *H04N 21/458* (2013.01); *H04N 21/6175* (2013.01); *H04N 21/6332* (2013.01); *H04N 21/6377* (2013.01); *H04N 21/64738* (2013.01)

(58) Field of Classification Search
CPC ......... H04N 21/2358; H04N 21/23805; H04N 21/26258; H04N 21/458; H04N 21/6175; H04N 21/6332; H04N 21/6377; H04N 21/64738; H04N 21/222; H04L 65/60; H04L 65/612; H04L 65/80; H04L 67/02; H04L 65/765

See application file for complete search history.

(56) References Cited

U.S. PATENT DOCUMENTS

| | | |
|---|---|---|
| 8,024,768 B2 | 9/2011 | Berger et al. |
| 8,027,671 B2 | 9/2011 | Wallace, Jr. et al. |
| 8,561,081 B1 | 10/2013 | Richards et al. |
| 8,612,517 B1 | 12/2013 | Yadid et al. |
| 8,701,145 B1 | 4/2014 | Berger et al. |
| 8,718,445 B1 | 5/2014 | Berger et al. |
| 8,754,765 B2 | 6/2014 | Berger et al. |
| 8,923,683 B1 | 12/2014 | Berger et al. |
| 8,929,717 B1 | 1/2015 | Berger et al. |
| 8,937,543 B2 | 1/2015 | Berger et al. |
| 9,112,838 B2 | 8/2015 | Wallace, Jr. et al. |
| 9,244,916 B2 | 1/2016 | Berger et al. |
| 9,596,514 B2 | 3/2017 | Kilar et al. |
| 9,621,840 B2 | 4/2017 | Berger et al. |
| 9,641,578 B2 | 5/2017 | Wheelock |
| 9,857,956 B2 | 1/2018 | Berger et al. |
| 10,104,357 B2 | 10/2018 | Berger et al. |
| 10,244,016 B1 | 3/2019 | Binns |
| 10,277,669 B1 | 4/2019 | Joliveau et al. |
| 10,433,023 B1 | 10/2019 | Joliveau et al. |
| 10,616,546 B2 | 4/2020 | Berger et al. |
| 2003/0204613 A1 | 10/2003 | Hudson |
| 2006/0062363 A1 | 3/2006 | Albrett |
| 2007/0061862 A1 | 3/2007 | Berger et al. |
| 2007/0086669 A1 | 4/2007 | Berger et al. |
| 2007/0198468 A1 | 8/2007 | Berger et al. |
| 2007/0283268 A1 | 12/2007 | Berger et al. |
| 2008/0049142 A1 | 2/2008 | Schohn et al. |
| 2008/0172698 A1 | 7/2008 | Berger et al. |
| 2008/0240675 A1 | 10/2008 | Berger et al. |
| 2009/0181655 A1 | 7/2009 | Wallace, Jr. et al. |
| 2010/0109868 A1 | 5/2010 | Berger et al. |
| 2011/0106964 A1 | 5/2011 | Bennett et al. |
| 2011/0312379 A1 | 12/2011 | Wallace, Jr. et al. |
| 2011/0314126 A1 | 12/2011 | Wallace, Jr. et al. |
| 2012/0159558 A1 | 6/2012 | Whyte |
| 2013/0144986 A1 | 6/2013 | Berger et al. |
| 2013/0276024 A1 | 10/2013 | Grant et al. |
| 2014/0006951 A1 | 1/2014 | Hunter |
| 2014/0019593 A1 | 1/2014 | Reznik et al. |
| 2014/0032718 A1 | 1/2014 | Berger et al. |
| 2014/0250383 A1 | 9/2014 | Berger et al. |
| 2014/0337903 A1 | 11/2014 | Zhu et al. |
| 2014/0355955 A1 | 12/2014 | Berger et al. |
| 2015/0039714 A1* | 2/2015 | Venturi ............ H04N 21/44004 709/213 |
| 2015/0063783 A1 | 3/2015 | Berger et al. |
| 2015/0074709 A1 | 3/2015 | Berger et al. |
| 2015/0074715 A1 | 3/2015 | Berger et al. |
| 2015/0095460 A1 | 4/2015 | Berger et al. |
| 2015/0095508 A1 | 4/2015 | Somayazulu et al. |
| 2015/0178747 A1* | 6/2015 | Tiwari ................... G06Q 30/06 705/7.31 |
| 2015/0282000 A1 | 10/2015 | Andersson et al. |
| 2015/0325268 A1 | 11/2015 | Berger et al. |
| 2015/0331599 A1 | 11/2015 | Berger et al. |
| 2015/0350277 A1 | 12/2015 | Voris et al. |
| 2016/0044086 A1 | 2/2016 | Wallace, Jr. et al. |
| 2016/0234293 A1 | 8/2016 | Berger et al. |
| 2017/0171589 A1 | 6/2017 | Phillips et al. |
| 2017/0188001 A1 | 6/2017 | Berger et al. |
| 2018/0011580 A1 | 1/2018 | Lebowitz |
| 2018/0191857 A1 | 7/2018 | Schooler |
| 2018/0241981 A1 | 8/2018 | Berger et al. |
| 2019/0069039 A1 | 2/2019 | Phillips |
| 2020/0126594 A1 | 4/2020 | Berger et al. |
| 2020/0204603 A1 | 6/2020 | Upadhyaya |
| 2020/0267362 A1 | 8/2020 | Berger et al. |
| 2020/0296151 A1 | 9/2020 | Berger et al. |
| 2021/0409668 A1 | 12/2021 | Berger |

OTHER PUBLICATIONS

Filip., "How to get 4 times better re-buffering with drip-feeding technique in ExoPlayer on Android", Luchianenco Filip, Oct. 11, 2019, 6 pages.

Liu et al., "Proxy Caching for Media Streaming Over the Internet", IEEE Communications Magazine, Aug. 2004, 88-94.

Penthera.com [online], "Penthera Download", published on or before Sep. 11, 2020, retrieved on May 17, 2021, retrieved from URL<https://www.penthera.com/download>, 2 pages.

Wpadvancedads.com [online], "Caching in a nutshell and what it means for ads?", published on or before Sep. 11, 2020, retrieved on May 17, 2021, retrieved from URL<https://wpadvancedads.com/caching-and-ads/>, 5 pages.

Non-Final Office Action dated Dec. 21, 2021 in U.S. Appl. No. 17/151,037 (49 pages).

International Search Report and Written Opinion issued in international Application No. PCT/US2021/049578, dated Jan. 26, 2022 (17 pages).

Alex Zambelli, "IIS Smooth Streaming Technical Overview", Microsoft Corporation, Mar. 2009 (17 pages).

\* cited by examiner

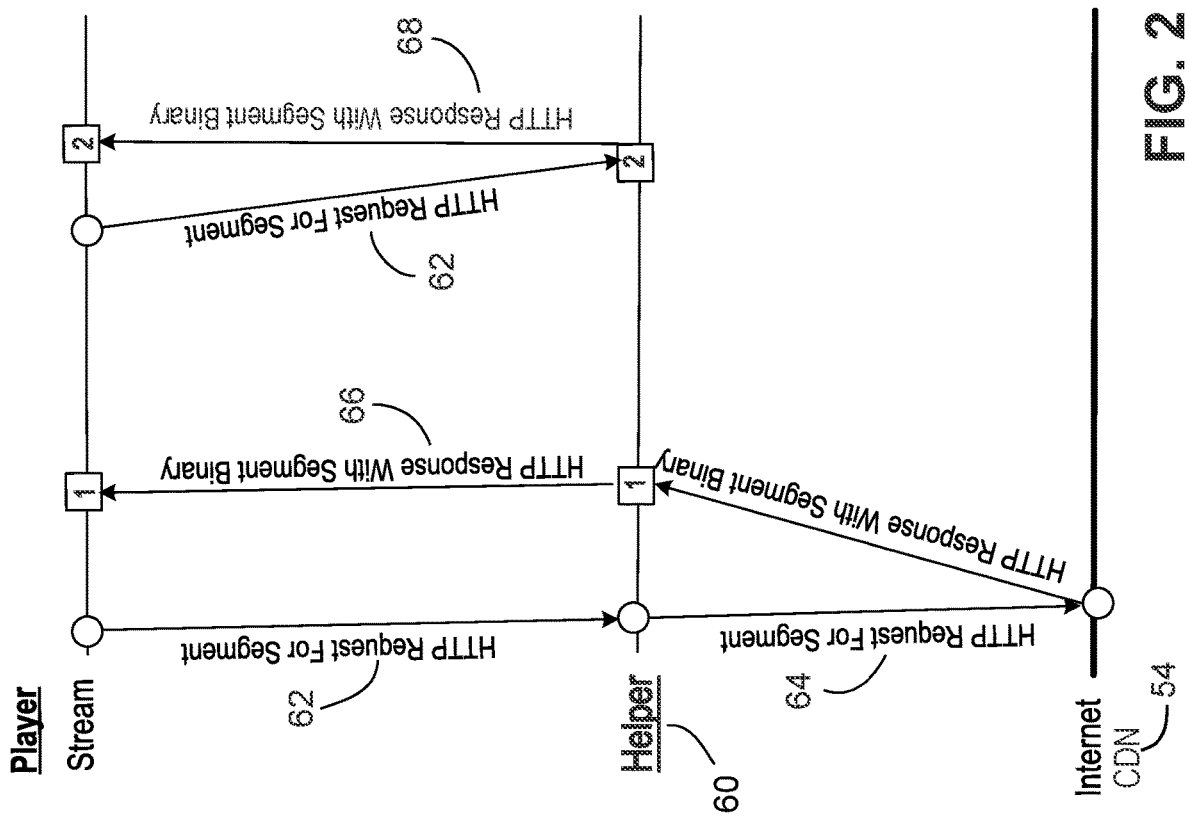
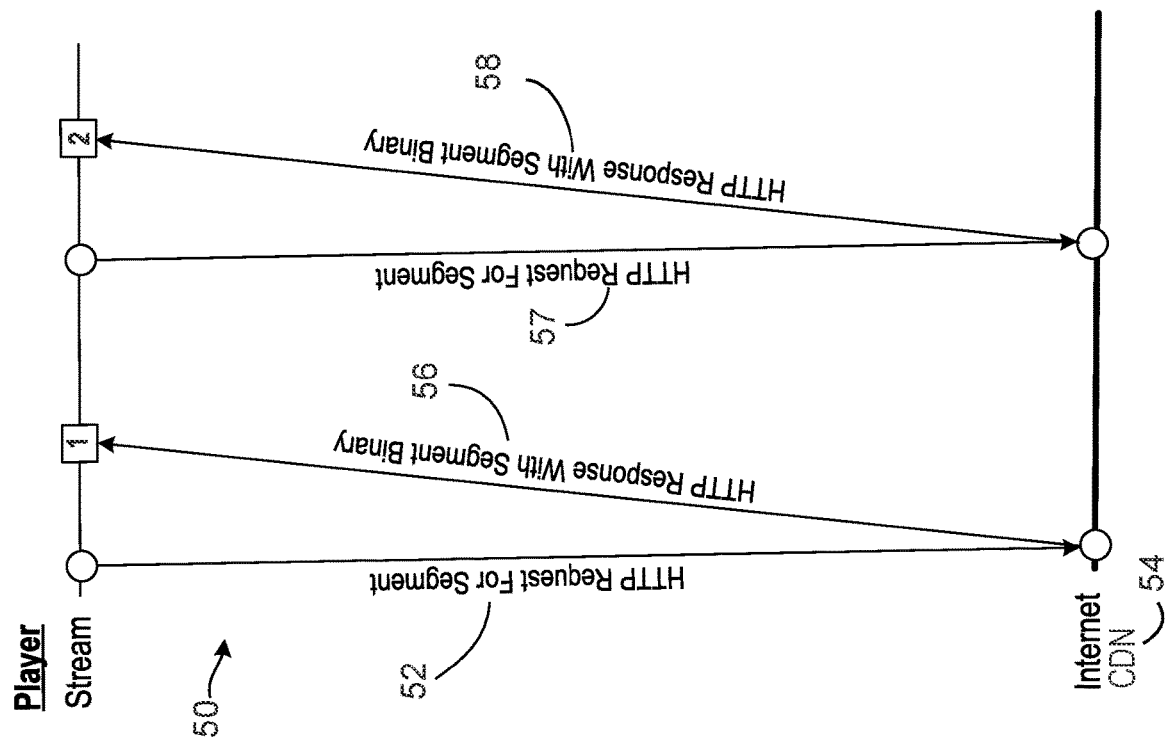
FIG. 2

PRESENTING MEDIA ITEMS ON A PLAYING DEVICE

CROSS-REFERENCE TO RELATED APPLICATIONS

This application is a continuation application of Ser. No. 17/349,563, filed on Jun. 16, 2021 (status pending), which is a continuation of U.S. patent application Ser. No. 17/151,037, filed on Jan. 15, 2021 (now U.S. patent Ser. No. 11/438,673, issued on Sep. 6, 2022), which is divisional of U.S. patent application Ser. No. 17/018,836, filed Sep. 11, 2020 (now abandoned). The above identified applications are incorporated by this reference in their entity.

BACKGROUND

This description relates to presenting media items on a playing device.

A typical smartphone, digital video recorder (DVR), connected TV, or other playing device is designed to present audio items, video items, or other media items received through a broadband network, a cellular telephone network, or another communication network. Media items to be presented to users can represent a wide variety of material including movies, pre-recorded television programs, and live programs such as sports or news, to name a few. The media items to be distributed are obtained from content sources (e.g., "origin servers"). These content sources may be managed by the content owners, such as suppliers of movies or TV shows and suppliers of advertisements ("ads") to be presented to users with the media items, or may be managed by distributors who have licensed the content from the owners. The media items are typically distributed to the playing devices by one or more distribution servers, such as the servers comprising a content delivery network (CDN). We sometimes use the term CDN broadly to include, for example, any kind of distribution or other servers. We sometimes refer to all servers, systems, and network components that are involved in delivering media items to an end user as "the network."

One role of CDNs is to situate copies of media items closer to the playing devices to reduce networking costs, improve reliability, and reduce delay in providing the media items to the playing devices for presentation. Copies of media items and ads can be stored at multiple distribution servers of the CDN placed at separated (e.g., widely separated) locations. When selected media items or ads are to be delivered to a particular playing device, a distribution server near to the playing device can be chosen for the delivery to reduce delay (latency) in the time it takes for the selected ad or media item to reach the playing device.

A typical media item is embodied as small files each representing a brief segment in a sequence of segments that together make up the media item. Each of the small files is expressed according to a streaming format defined by a conventional streaming protocol and we sometimes call them "streaming-format files" or more simply "streaming files". The playing device includes a processor and a relatively small amount of high-speed short-term memory. When the media item is being presented on the playing device, a portion of the high-speed short-term memory is dedicated for use as a buffer to briefly hold a relatively small number of the streaming files. The buffer is managed by a player, an application that executes on the playing device.

Before a player presents a media item, it receives (e.g., downloads) a manifest file from the CDN and stores it in the buffer of the player. The manifest file can be provided to the CDN in turn from an origin server. The manifest file contains metadata used by the player to identify to the CDN each of the streaming files that may be the subject of a request by the player. The metadata indicates the order of the streaming files within the media item. Typically, the manifest file is stored in the playing device's short-term memory, and the player requests the streaming files from the CDN in order and stores them in the short-term memory buffer.

During presentation of a streaming media item, the player requests the streaming files one after another as needed from the CDN and stores them temporarily in the buffer. Then the player fetches streaming files one after another from the buffer as needed to render them for presentation on the playing device in a continuous uninterrupted sequence (normally a few seconds after they are received) as part of the media item. As streaming files are drawn from buffer locations for rendering, those locations are repopulated by other streaming files received from the CDN in response to requests made by the player.

During presentation of a media item, the streaming files must be received (e.g., downloaded) into the buffer locations quickly enough through a communication channel of the communication network to assure that the buffer will not be emptied during the presentation. The quality of the presentation depends on the quality of (e.g., the amount of bandwidth available on) a communication channel of the communication network. For high quality presentation of a media item, the quality of the channel must be sufficient to enable high quality (e.g. large) versions of the streaming files to be delivered on the communication channel between the CDN and the playing device.

Traditionally, the available bandwidths of communication channels provided by communication networks to the playing devices fluctuate. As a result, the CDN often cannot keep the player buffers supplied quickly and reliably with enough high quality files to support high-quality presentation of the media item, and lower quality files must be sent to the player. In any case, the bandwidths of communication channels vary (sometimes rapidly and unpredictably) over time which can result in rapidly varying quality of the presentation at the playing device. In some cases the quality of the communication channel is so poor that even lower quality files cannot be delivered to the playing device.

Techniques have been developed for presenting media items to users at an acceptable quality level in view of the facts that (a) the short-term memory buffers are relatively small and (b) the communication networks provide communication channels of unpredictably varying (and sometimes low) quality. In one common approach, known as adaptive bitrate streaming, the quality (size) of the streaming files is varied during presentation of the media item to accommodate changes in the communication channel quality, and the player is designed to take advantage of the varying quality files to provide the best possible presentation of a media item.

To accommodate cases in which a user wants to have a media item presented at a future time when she expects there will be no connectivity (for example, on a future airplane flight), the playing device can be configured to accept and act on an input or other action by the user to cause a complete set of streaming files for the media item to be delivered in advance when there is connectivity and to be persistently stored at the playing device. Later, when she is on the flight, for example, she can have the player present the media item by streaming the files from persistent storage on the playing device rather than needing to request through the communication network from a CDN. An example of such a system is available from Penthera Partners.

An HTTP proxy can be used to download media items for later consumption. At the time of consumption, the playing device may be offline or online. The downloaded media items will play from the locally stored set of streaming files, without the playing device needing to request them from the CDN (with the potential associated fluctuating, limited, or absent connectivity). A user must choose to engage the download feature by clicking a download button or in one case (Netflix Smart Download) automatically in response to a user's viewing behavior.

In a traditional model for media item presentation, a principal (and sometimes only) function of the CDN is to deliver the streaming files and the manifest file for a media item to a large number of players in the most effective way and with the least delay. The principal (and sometimes only) function of the players is to request the streaming files from the CDN as needed to keep the buffers appropriately populated and then to render the files to present the media item to the user.

To fund the cost of creating media items and delivering them to playing devices for presentation to users, ads can be presented to the user before, during, or after presentation of a media item. Ads are like media items in that they are embodied in streaming files that can be requested, stored by the player, and presented at appropriate times in conjunction with media items, for example. (Sometimes when we use the term "media items" we are referring to the main content to be presented to users and also to the ads. Sometimes we are referring only to the main content.) The manifest metadata for a typical media item includes information indicating the times and durations of ad insertion points where ads are to be presented relative to the streaming files of the media item.

Decisions about which ads to present at each ad insertion point are usually made at a time very near to the delivery of the media item. Ad decisions can encompass choices about which ads should be used, how many ads should be used, and when the ads should be used for a given media item. Ad decisions are typically made by ad servers and are generally made by considering various factors including audience targeting data, the times when the ads are anticipated to be presented, the appropriateness of the ads, and others. Once the ad decisions are made, the selected ads are presented at the appropriate times during the presentation of the corresponding media item as a result of an activity known as "ad insertion" or "ad stitching." Ad insertion typically involves creating a new manifest that includes metadata to enable the player to locate and request the streaming files of the ad at the right places in the presentation of the media item. During presentation, the requested media item streaming files can be provided by a CDN from the origin servers, and the ad streaming files can be provided by a CDN from the ad servers.

In some systems that deliver media items from a CDN to playing devices, so-called trick-mode features (such as rewind, fast forward, and pause) are performed in response to trick-mode instructions from the user through the media player while a media item is being presented to the user. When a user issues a trick-mode instruction that requires streaming-mode files not then available locally in the buffer, the media player requests the CDN to provide the needed files, stores them locally in the buffer, and uses them to provide the trick-mode features. This process can cause annoying delay in the execution of the trick-mode instructions on the playing device.

Part of the workflow of delivery of media items can entail controlling the quality of the media items based on the bandwidth and quality of the connection to the playing device.

Additional information about streaming media items is provided in U.S. Pat. Nos. 9,244,916; 8,701,145; 10,616,546; and 9,857,956; and United States published patent application 2015/00325268, the entire contents of all of which are incorporated here by reference.

SUMMARY

In general, in an aspect, versions of representations of segments of a media item are received and temporarily stored on a media playing device. The segments have a sequence. The temporarily stored versions are used in sequence to present at least part of the media item to a user. One or more other versions of representations of segments of the media item are also received and persistently stored on the media playing device. The one or more persistently stored other versions are used to enhance the presentation of at least part of the media item to the user.

Implementations may include one or a combination of two or more of the following features. The representations of the segments include streaming files. The temporarily stored versions and at least one of the persistently stored other versions have different qualities. The qualities may represent a size or a bit rate or both. The temporarily stored versions are received and temporarily stored by a media player, and the one or more persistently stored other versions are received and persistently stored by a helper. The enhancement of the presentation includes improving the smoothness or quality of the presentation or reducing disruptions or interruptions of the presentation or both. The persistently stored one or more versions are persistently stored in longer-term storage. The temporarily stored versions are temporarily stored in volatile memory. The media playing device may be a device configured to present one or more media items to an end user. The media playing device includes one or more of a smartphone, a tablet, a laptop, a desktop, a connected TV, or a stand-alone media streaming device. The use of the persistently stored other versions to enhance the presentation includes providing other stored versions of a minimum quality when a quality of the temporarily stored versions falls to the minimum quality level or lower or the playing device is unable to receive the versions to be temporarily stored.

In general, in an aspect, requests are received from a media player for versions of representations of segments of a media item to be presented in a sequence to a user. The versions that are the subject of the requests are of a first quality. By a manner in which the versions are delivered to the media player in response to the requests, the manner in which subsequent requests are made by the media player is influenced.

Implementations may include one or a combination of two or more of the following features. The manner in which the versions are delivered includes a rate at which the versions are delivered. The versions are delivered at a rate corresponding to a quality of a communication channel from which the versions are delivered in response to the requests. The subsequent requests are for versions of a second quality different from the first quality. The first quality of the versions is associated with a quality of a communication channel from which the versions are delivered in response to the requests. The versions are delivered from a communication channel or from local storage depending on the quality of the communication channel relative to the quality of the versions requested. The versions are delivered from the local storage if the versions in the local storage are of a quality at least as high as the quality of the versions that are being requested by the media player. The local storage is co-located with the helper. The helper may be resident with the media player or be part of a distinct physical device that provides services to the player, which acts as a consumer. At least some of the versions are delivered from the communication channel when the quality of the communication channel is more than sufficient to carry the requested versions, and at least some of the versions are delivered from the local storage when the quality of the communication channel is not more than sufficient to carry the requested version. At least some of the versions are delivered to the media player from storage that is co-located with the helper. The versions include streaming-format files.

In general, in an aspect, in response to requests from a media player for representations of segments of a media item to be presented in a sequence to a user, delivery of the requested representations to the media player is controlled so that at least some of the requested representations are delivered from a communication channel for presentation in the sequence and at least some of the requested representations are delivered from persistent storage co-located with the helper.

Implementations may include one or a combination of two or more the following features. The controlling of the delivery of the requested representations is based on a quality of the communication channel. The controlling of a delivery of the requested representations is dependent on a service to be provided in connection with the presentation of the sequence to the user. Representations of the segments are requested from a CDN for storage in the persistent local storage while the representations requested by the media player are also being delivered to the media player. The representations requested by the media player are in turn requested from a CDN and are delivered to the media player. In some implementations the representations are delivered to the media player without being stored in the persistent local storage. In some implementations, the representations requested from the CDN are also stored in the persistent local storage.

In general, in an aspect, information is generated about the quality of a communication channel that is configured to deliver versions of representations of segments of media items between a CDN and temporary storage of a media playing device in response to requests of a media player. The versions of the representations are to be presented to a user of the media playing device from the temporary storage. Based on the generated information about the quality of the communication channel, a determination is made whether to use other versions of the representations persistently stored on the media playing device instead of requesting the versions of the representations which are to be delivered to the temporary storage from the CDN based on the requests of the media player.

Implementations may include one or a combination of two or more of the following features. The other versions are of lesser quality than the quality of the versions to be delivered to the temporary storage. The quality of the versions which are to be delivered to the temporary storage being requested by the media player varies and the other versions are used to serve at least some requests of the media player when the quality of the versions to be delivered to the temporary storage is not greater than a threshold quality. The other versions are of at least a minimal quality. The minimal quality could be the lowest quality. The minimal quality could be the highest quality. The minimal quality could be a quality between the highest quality and the lowest quality.

In general, in an aspect, requests are made to a CDN or content origin server for player-requested versions of representations of segments of a media item. The player-requested versions are delivered to the media player. Requests are made to the CDN or content origin server for one or more other versions of the representations of segments of the media item. The requested one or more other version are persistently stored. The requests for the second versions are interleaved with the requests for the first versions.

Implementations may include one or a combination of two or more of the following features. In some implementations, at least some of the player-requested versions and the one or more other versions are of different qualities. In some implementations, the player-requested versions and the one or more other versions are of the same quality. The quality of the communication channel is sufficient to carry both the player-requested versions and the one or more other versions during the interleaving. Sometimes the one or more other versions are delivered from the persistent storage to the media player instead of the player-requested versions being delivered.

In general, in an aspect, at a client side of a communication channel, an ad is received including representations of a sequence of segments of the ad The representations of the sequence of segments of the ad are persistently stored on the client side of the communication channel. After the representations of the sequence of segments of the ad have been persistently stored and when a media player on the client side reaches an ad insertion point during presentation of a media item, the representations of the sequence of the segments of the ad are delivered to the media player for presentation as part of the presentation of the media item.

Implementations may include one or combination of two or more of the following features. In some implementations, the representations are persistently stored prior to the start of the presentation of the media item. In some implementations, the representations are stored after the start of the presentation of the media item.

In general, in an aspect, representations of segments of a media item are received at a client side of a communication channel. The representations are persistently stored on the client side of the communication channel. After the representations have been persistently stored and in connection with a media player presenting the media item on the client side, trick mode features are provided with respect to the media item.

In general, in an aspect, versions of representations of segments of a media item are received at a client side of a communication channel. The versions include different versions of different quality of at least one of the representations. Both of the different versions are stored at the same time on a media playing device on the client side. At least one of the different versions are stored persistently, and one or the other or both of the stored versions are used in connection with presentation of the media item to a user through the media playing device.

Implementations may include one or a combination of two or more of the following features after storing both of the different versions, a selected one of the versions is discarded while continuing to store the other one of the versions. Both of the versions are stored persistently. Both of the versions are received through the communication channel based on requests from a helper. One of the requests is triggered by a corresponding request from a media player and the other request is not triggered by a corresponding request from the media player. The helper determines whether to continue to persistently store the representation at the higher quality or the representation at the lower quality or both representations.

These and other aspects, features, implementations, and advantages (a) can be expressed as methods, apparatus, systems, components, program products, business methods, means or steps for performing functions, and in other ways, and (b) will become apparent from the following description and from the claims.

BRIEF DESCRIPTION OD THE DRAWINGS

FIG. 1 is a block diagram.
FIGS. 2 through 8 are sequential activity diagrams.
FIG. 9 is a block diagram.

DETAILED DESCRIPTION

As shown in FIG. 1, we describe a technology 10 that may be implemented, for example, as a process 12 (e.g., a helper) running on a media playing device 14 and that provides services 16 to (e.g., helps) a player 18 that is also running on the playing device. The services enable the player, among other things, to sometimes provide higher quality presentations or uninterrupted presentations (or both) of streaming media items 20 than it would otherwise be able to do. The higher quality presentations may be achieved in the context of (a) the limited amount of high-speed memory 23 available to the player for buffering in a buffer 22 on the playing device and (b) the varying (and sometimes poor) quality of the communication channel 24 between the playing device and the CDN 26 through which the streaming files 28 of the media item are delivered. Among other things, the technology can be based on an assumption that the communication and computational resources used to request and store more streaming files than are certain to be used in presentation of the media item will not be wasted because the user is likely to continue with a media item once the presentation has started or is likely to make use of the media item later. Although we frequently refer to CDNs as the technology by which media items are streamed to playing devices, in some cases, media items can be delivered to playing devices on streaming networks that don't operate as or include a CDN.

We use the term "playing device" broadly to include, for example, any component, computer, mobile device, or other kind of equipment for presenting media items that have been or are being received, for example, from another device or another location. In some cases, the media item is a streaming media item and the media item is received through a communication channel of a communication network from a server as a sequence of streaming files. Playing devices can include smartphones, tablets, DVRs, set top boxes, computers, smart or connected TVs, game consoles (such as Xbox), streaming devices (such as Roku or Fire TV Stick) and personal assistant devices (such as Alexa) to name a few examples. A playing device can be implemented in a single physical device or in a combination of two or more cooperating physical devices. The player typically runs on the playing device, and the helper (described below) may reside in its entirety on the playing device or be resident in a different physical device in the same local network.

We use the term "media item" broadly to include, for example, any representation of audio, video, images, text, or other form of presentation (or combinations of them) of content. We sometimes use "media item" to refer to a form of presentation of content that is sequential over time, such as a movie, TV show, music, podcast, radio show, or advertisement, to name a few. In some cases, the sequential aspect of a media item is represented in a streaming format and the process of presenting the media item is known as "streaming."

We use the term "player" broadly to include, for example, any application, module, software, feature, operating system, or other process to process digital information (such as streaming files), render the digital information in presentable form as part or all of media items, and present the rendered material to a user through displays, glasses, projectors, speakers, earphones or a wide variety of other interface devices 30 and combinations of them. In some cases, a player provides no more than a minimal set of capabilities to present media items. In some cases, the player can include a more comprehensive set of features and functions or be embedded in or called from an application having a more comprehensive set of features and functions.

We use the term "communication channel" broadly to include, for example, any wired or wireless path, route, medium, or mechanism for carrying digital signals from one device or place to another. A communication channel can be implemented as part of a communication network and typically is bandwidth limited. The quality of a channel can vary slowly or rapidly and can depend on bandwidth and other characteristics.

We use the term "streaming file" broadly to include any digital representation of one or a series of two or more segments of a media item that is to be presented, for example, in sequence with one or more other streaming files as part of the continuous presentation of the media item. The streaming file can be expressed according to a standard protocol, such as a so-called streaming protocol or in another way, such as according to a non-standard protocol, or a defined approach other than a protocol. In some examples, the player can request streaming files representing segments of the media item in a sequence by requesting defined byte-ranges of a master file of the media item from the server The "quality" of a digital file for a media item can refer to the fineness of the detail captured by the file, such as its resolution, or frame rate (in the case of video), or sample rate (in the case of audio). A high quality streaming file may have a high resolution, for example. Generally, higher quality digital files are larger than lower quality digital files for a given content. The "quality" of a presentation of a media item can be expressed in terms of the smoothness, continuity, resolution, and appearance to the user, among other characteristics.

In some streaming systems, a CDN can deliver through the communication channel multiple different versions of a given streaming file. For example, the different versions can have different qualities and therefore different sizes. Versions of a streaming file are sometimes identified by the bitrate (say 50 Kbps), a representation of the number of bits used within a portion of a media item to represent a particular period of time during presentation of the media item. For example, a 50 Kbps video carries 50 Kb on average per second of video presentation. Generally, the total size of a media item (e.g., a video) can be determined by multiplying its bitrate by its duration. Implicitly, the bitrate is correlated to the rate at which the streaming files of a media item must be carried on the communication channel in order to provide a smooth streaming experience at the playing device.

In some implementations, the technology (e.g., the helper) takes advantage of the persistent storage space 35 available on the playing device, which is lower speed but also more abundant than the more limited high-speed memory space available to the player. Using the larger but typically slower persistent storage space, the technology can, among things, (a) request of the CDN and store streaming files for the media item earlier than would typically be done by a player, (b) store more streaming files for the media item at a given time than would typically be done by a player, or (c) store streaming files for a media item for longer periods than would typically be done by a player, or any combination of two or more of activities (a), (b), and (c). We sometimes refer to the technology or the process implemented by the technology on or for the benefit of the playing device as a "helper." Although we sometimes refer to the helper as being distinct from the player that is also running on the playing device, in some implementations, the helper can be incorporated in or its functions performed as part of the player itself and may not exist as a separate process from the player. In some cases, the functions of the helper can be performed partly in the player and partly in a distinct process, or even partly as part of another application or piece of software.

In some implementations, the requests for streaming that normally would have been sent from the player directly to the CDN through the communication channel may be sent instead to the helper. The helper may then, for example, (a) send corresponding requests directly to the CDN on behalf of the player and provide the streaming files received from the CDN directly to the player, for example, without storing them persistently in the persistent storage, (b) handle the requests from the player by providing the streaming files from the streaming files that the helper has stored persistently, or (c) a combination of (a) and (b). This arrangement enables the helper to sometimes improve the quality of the presentation of the media item by the player and to perform other useful functions and features in some cases as a helper to the player or other consumer.

The Helper

Better Quality Presentation of Streaming Media Items

The helper can improve the quality of the presentation of streaming media items and can enhance the flexibility, robustness, and richness of the presentation of streaming media items by providing additional and improved functions and features associated with the presentation. It can achieve this result, among other reasons, because it can receive the streaming files farther in advance of their use than is typically the case in conventional streaming by a player, can request and store more streaming files and better quality streaming files than can typically be stored at one time in a player buffer 22, and can store the streaming files in the persistent storage 35 of the playing device for a longer period than the streaming files are stored in conventional streaming including storing them after (even long after) they have been received or presented. Among other things, even if the communication channel quality is poor or unreliable, the negative effect on the quality of the presentation in the streaming mode may be reduced or eliminated during the player's presentation of the media item, because good quality streaming files are already stored persistently on the playing device and can be made available by the helper immediately for some or all of the streaming files that the player conventionally would have needed to request directly from the CDN. In many uses of the technology, the helper provides its services to the player shortly before, during, or shortly after the player presents a media item. In some instances, the helper can provide its services long after a first presentation of the media item. In most cases, the helper provides its services while the playing device has at least a minimal quality of connectivity through a communication channel to a CDN.

In some implementations, the helper provides functions, features, and other services to the playing device, to the player running on the device, and to other applications and processes running on the device among other consumers. In some cases, we refer to the entities being served as "consumers". We also sometimes use the simple term "player" to refer more broadly to all kinds of "consumers". In some instances the helper could provide functions, features, and services to other devices and processes and applications running on other devices.

Core Functions of the Helper

In order to be able to provide its services, the helper performs the following core functions, among others:

(1) Requests and receives streaming files over the communication network from a CDN or other distribution server. The streaming files can be requested at the time of and to serve requests issued by a consumer or can be requested by the helper in advance to populate the persistently stored cache 37 in anticipation of supplying them to the player in response to requests for streaming files, often while the player is engaged in presenting the media item.

(2) Stores the streaming files persistently in a cache on the playing device and eventually deletes the stored streaming files based on certain conditions.

(3) Provides access to the streaming files for (and uses the files for the benefit of) one or more consumers installed and running on, for example, the playing device, including the player. For this purpose, the helper can communicate with one or more applications or processes using standard communication protocols, such as HTTP, FTP, UDP, or other Internet protocols.

(4) Anticipates when the player will need streaming files so that it can request and receive them from the CDN in time to provide them to the player.

As noted earlier, the helper can (a) store more streaming files (up to and including all of the streaming files) of the media item than are typically stored in the short term buffer 22 of the player, (b) store one or more of the streaming files for a longer (e.g., much longer) time than the player stores in its buffer, (c) request, receive, and store the streaming files in the helper's cache earlier than or in parallel with the requesting, receiving, and storing than would otherwise be performed by the player in its buffer, and can perform combinations of (a), (b), and (c). As a result, the helper will often have a larger set of streaming files available in the helper cache sooner and for longer periods than media files are available in the player buffer. The streaming files in the cache can be used in providing services that the player or other consumer cannot alone perform or cannot perform as well. In many cases, the services are provided while the player or other consumer is presenting or using the streaming files and while the playing device has connectivity through a communication channel to a CDN.

Helper Implementation

The helper can be installed and run as a process on the playing device or an associated device and can serve the player and interact with the CDN through the communication network, generally without requiring changes to the operation of the player or in the way that it requests and receives streaming files. Changes to the existing workflow of the player also are not required though they are possible. In addition, the operation of the helper does not require any change to the CDN or its interaction with the playing device.

In some cases, the helper can be provided as code separate and distinct from the player and designed to interact with the player by a defined communication protocol (an API) that can include requests for streaming files and delivery of streaming files in response to the requests. In some examples, part or all of the helper can be incorporated into the player. In some instances, part or all of the player can be incorporated into the helper. All or part of the player can be incorporated into the operating system 19 of the playing device. Part or all of the helper can be implemented in a device that is separate and distinct from the playing device. For example, the helper could be implemented in a storage device that is local to the playing device, such as a storage device in a house. More generally, in a context in which a playing device is co-located (say in a house) or co-owned or co-used along with other devices that together use one or more common accounts for access to a communication channel, part or all of the helper could be located in one or more of the other devices. In some implementations, the helper could be split into parts that are installed and running on the playing device and another cooperating device, with the two parts communicating with one another by a defined communication protocol.

In cases in which the helper and the player communicate by requests for and delivery of streaming files in response to the requests, the specific communication protocol could be as shown in FIG. 2. The left side of FIG. 2 illustrates part of a typical streaming session 50 conducted without involvement of the helper. HTTP transport is shown as an example protocol, as current typical streaming approaches utilize HTTP as the transport mechanism; other protocols or communication techniques could be used. The player makes a request 52 to the CDN 54 through the communication channel of a communication network (for example, the Internet), and the CDN responds 56 by delivering a streaming file (e.g., a file representing a segment 1 of the media item) for presentation to the user as part of the media item. The process is iterated with another request 57 and response 58 carrying a streaming file for a segment 2, and so on.

The right side of FIG. 2 illustrates an example of the process in which the helper 60 has been installed and is involved. In this example, the player is configured to operate as a consumer with respect to the services of the helper. The configuration may be achieved, for example, by an explicit configuration process between the player and the helper, by the helper's capability to accept and process all network requests of the consumer on behalf of the CDN, or other approaches, and combinations of them.

The helper can, in some cases, be configured to accept and process all network traffic from the device (for example, requests for streaming files) prior to the traffic being sent to the network (e.g., the CDN). This configuration of the helper might be called a "native proxy" mode. In some implementations, if a native proxy configuration is not reasonably possible, the player can be altered to be aware of the helper and directly make requests to it. This could be called a "direct configuration."

In the native proxy configuration, the helper receives and has the option to process all traffic from the player or other processes running on the device. In the direct configuration, the helper only receives requests from the player, and the player must be configured to be aware of the helper. In cases where the helper cannot be configured to accept and process all requests, the player is configured to be aware of the helper and to make the player's requests for streaming files via the helper. The player is provided a custom URL that invokes the helper directly and allows the player to communicate to the helper the streaming files that the player requires.

The manifest returned by the helper is adjusted so that all future requests for streaming files are directed from the player to the helper to service. The player makes an HTTP request 62 for a streaming file representing a segment 1 of the media item. The request is received by the helper as a result of the explicit or implicit configuration arrangements between the helper and the player. The helper may then choose to request the streaming file for that segment 64 from the CDN, and then supply that streaming file 66 to the player. For a next segment 2, the helper may choose to return the streaming file 68 for that segment from a version persistently stored by the player, without utilizing the CDN, if a version already exists in the helper's cache.

The helper is typically implemented as software but could also be implemented as firmware or a combination of software and firmware. The helper is located on the other side of the communication channel from the CDN and past the "last mile" of the communication path extending from the origin servers through the CDN and ending at the local network the playing device is connected to. We sometimes use the term "local network" to refer to a network that interconnects two or more devices including the playing device in a place on the other side of the communication channel from the CDN. A local network could include a wireless network in a house served by a connection to a TV cable service or to a telephone system, for example.

Figure 3:
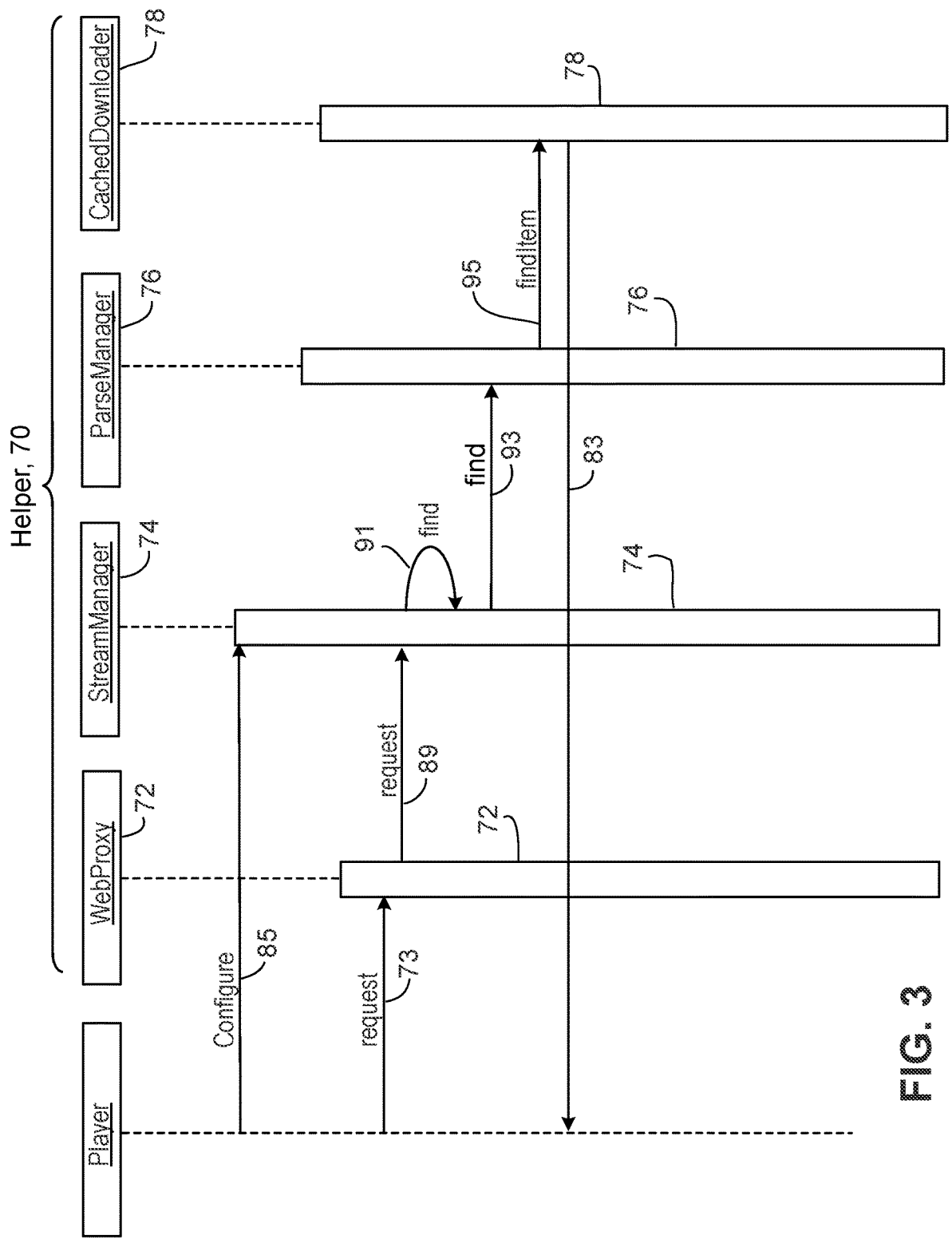

FIG. 3 shows an example of an architecture and operation of a typical helper 70. The helper communicates with the player using a Web proxy 72, which receives streaming file requests 73 from the player and directs them to a stream manager 74. The stream manager coordinates the streaming file needs of the player and directs a parse manager 76 and, through the parse manager, a cached downloader 78 to perform their actions to fulfill the service to be provided by the helper. The stream manager is also the only developer-visible component of the helper providing access to configuration settings that individual developers may wish to adjust 85. The parse manager coordinates parsing of streaming file manifests. The parse manager is managed by the stream manager, which invokes the parse manager after the Web proxy 72 receives a request from the player 73 for the master manifest for a streaming media item. The request is sent by the Web proxy to the stream manager 89 for servicing. The stream manager then does a "find" for the streaming file or other file being requested 91. Once the streaming file or other file is identified within the stream, a request is made to the parse manager 93 to locate the individual streaming file or other file. The parse manager identifies the requested streaming file within recorded streaming manifests and then makes a request 95 to the cached downloader for the actual streaming file. The cached downloader then either retrieves the streaming file or other file from the CDN or returns the streaming file or other file from its cache (which we have sometimes referred to as the helper's cache). If the requested file was a master manifest or a secondary manifest, when the manifest is returned to the parse manager 83, the parse manager begins analyzing the manifest and will make further requests for additional streaming files as defined by, for example, the strategies identified in this document 95 sometimes in anticipation of the player's future requests or the player's future needs.

A manifest may be an original online version of the manifest available from the CDN or a version rewritten for the use of the helper, listing streaming files for segments or media items or other items from the CDN. The parse manager uses the information in the manifest to catalog all streaming files that make up a media item and, if necessary, will request a download of each streaming file by making a request 95 to the cached downloader 78. The cached downloader manages downloading of manifests, streaming files for segments of media items, or other items from the CDN. The cached downloader calculates the estimated available bandwidth and estimated utilized bandwidth on the communication channel, by observing the size and bitrates of the received files and by recording the times it takes to receive these files from the CDN, and determines how and when to efficiently download requested streaming files and other files without impeding the player's own needs for use of the CDN. The cached downloader services the requests from the player by returning 83 to the player a cached streaming file or other file or a CDN-retrieved version of a streaming file or other file. In some implementations, the cached downloader controls the return of the cached or other retrieved file in accordance with a simulated bandwidth.

A wide variety of other implementations of the helper are possible.

The helper can be part of an operating system 19 of the playing device, or part or all of an application 21, a player 18, or another process installed on the playing device, or other co-located or co-used or co-owned devices, or combinations of them. The helper can be installed either by a playing device manufacturer, in the playing device as a root function of player firmware, or as an optional software package installed by developers and built with applications that are later installed by users onto a playing device. Depending on the desired function of the helper, it may be enabled automatically when the device is turned on or by the launch of an individual application by the user. Such applications can be dedicated to interaction with corresponding proprietary media distribution systems, or can have more universal functions and features.

Typically the services provided by the helper relate (a) to media items (including ads) received from the CDN or other distribution servers, (b) to the presentation of the media items and the ads to the user by the player, (c) to storage and retrieval of portions or all of the media items at the playing device or other co-located or co-used or co-owned devices, (d) to streaming files that represent segments making up the media items and ads, among other things, and (e) to functions and features that are built on the services of (a) through (d), among others.

In some implementations, the helper supplements and supports (but does not fully replace or substitute for) operations of one or more consumers. In providing some services, the helper does fully replace or substitute for one or more consumers. In some cases, the helper is configured to operate in parallel with and to cooperate with one or more consumers.

As mentioned earlier, the playing device typically has access ("connectivity") through a wired or wireless connection (communication channel) to the Internet, a cellular network, or another communication network. The connectivity of the playing device to the communication network can be fixed ("persistent" or "uninterrupted") or can be intermittent (e.g., sometimes on and sometimes off, or of varying quality, or both).

In some examples, the helper maintains a cache in long-term storage of the playing device or other co-located or co-used or co-owned devices in which it stores all or part of a media item and from which it retrieves streaming files of one or more media items or ads or both that have been requested and received from a CDN or other distribution server or ad server. Some services of the helper involve providing responses to requests by the player for streaming files that represent part or all of media items or ads or both.

Helper Operates Between the Player and the Communication Channel to the CDN

To perform its functions, the helper in some respects operates "between" the player and the communication channel that links the playing device to the CDN. In conventional operation, a player would send its requests and receive the requested streaming files directly to and from the CDN.

In some cases, in the technology that we describe here, all requests for streaming files from the player are received and handled by the helper, and the requested streaming files are delivered to the player by the helper. In general, however, the player need not be aware that the helper is operating in between the player and the CDN. The sending of requests and the receiving of the streaming files can appear to the player to occur in the same way that it occurs conventionally.

In examples of conventional streaming operation between the playing device and the CDN, the playing device would request streaming files directly from the CDN at a dynamically changing quality using adaptive bitrate streaming algorithms conforming to the specification of the streaming protocol being used (for example, HLS or DASH) and designed to enable the player to present the highest possible quality level for the media item given the current quality of the communication channel. In the technology that we describe here, the player can continue to use the adaptive bitrate streaming algorithms in the usual way, and the helper takes advantage of information about the changing quality of requests of the player to perform some of its functions.

In some implementations, the helper monitors the times between the player requests for streaming files and, based on those times, the calculated bandwidth overhead available on the communication channel to make additional requests for streaming files or other items or data (or combinations of them) that may be requested by the player (or useful to the helper) in the future.

Figure 4:
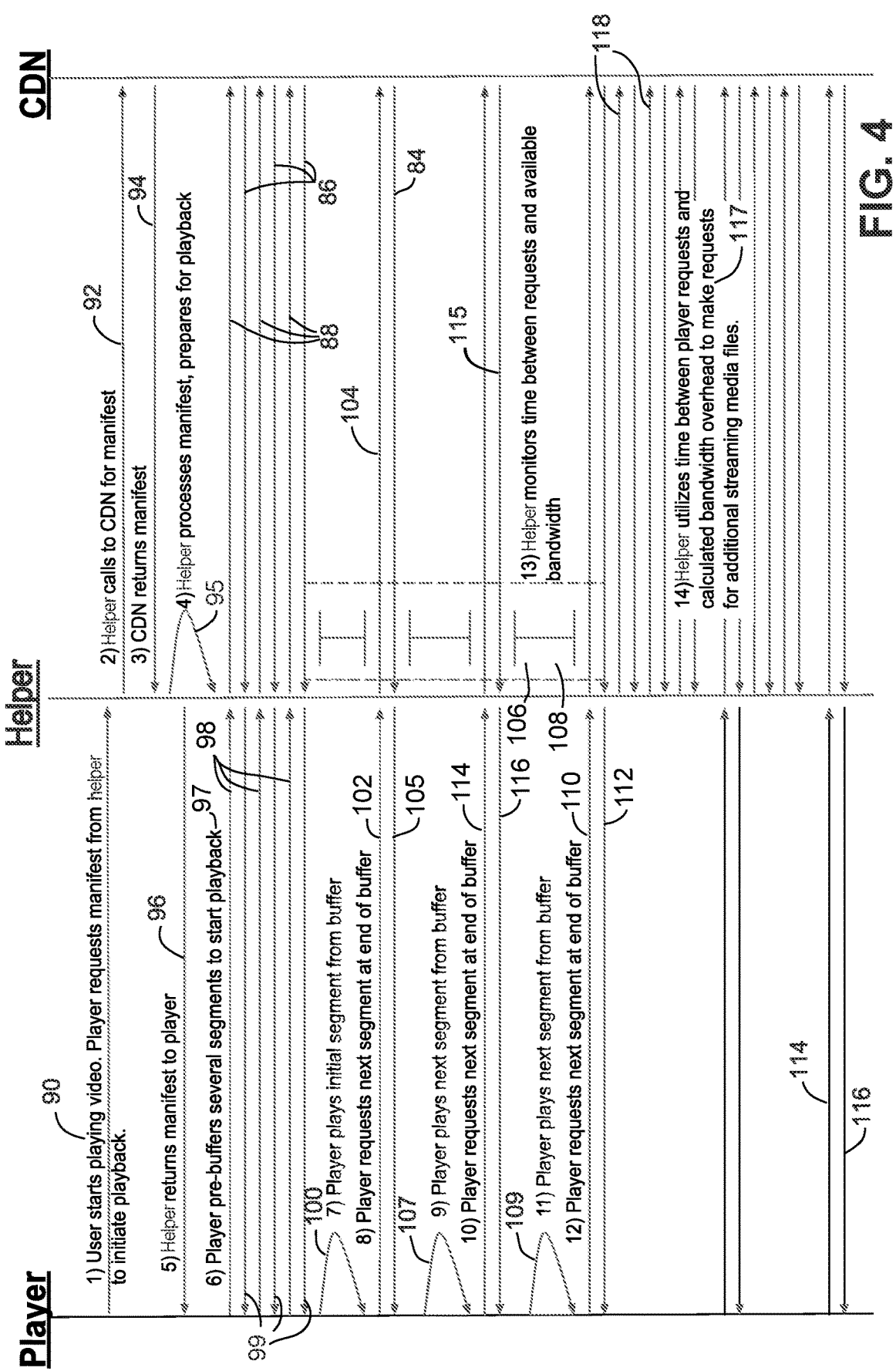

As shown in FIG. 4, when the user of the playing device invokes the playing of a media item (e.g., a video), the player will request 90 the corresponding manifest from the helper to initiate the presentation of the media item. As a result, the helper sends a corresponding request 92 to the CDN for the manifest. The CDN returns the manifest 94 to the helper. The helper processes (e.g., revises) 95 the manifest to get it ready for use by the player as discussed earlier. Then the helper returns the revised manifest 96 to the player which stores it temporarily in the memory of the playing device. Based on the information in the manifest, the player requests 98 from the helper each of the sequence of streaming files for the media item in turn, and the helper requests 88, receives 86, and returns 99 each of the streaming files in turn. The player stores the received streaming files in order in the successive locations of the player's buffer. The player stores (that is, it pre-buffers) several streaming files for media item segments before starting the presentation 97. After pre-buffering, the player presents 100 the streaming file for the initial segment of the media item and requests 102 the next streaming file (that is, the streaming file that is after the one most recently requested in the sequence and already held in the buffer) from the helper. The helper requests 104 the next streaming file from the CDN, receives it 84, and provides it to the player 105 for use in the ongoing presentation 107. The process of (a) the player requesting and receiving streaming files from the helper in sequence, placing them in the player's buffer in sequence, and fetching them from the front end of the buffer and presenting them and (b) the helper requesting and receiving the streaming files in order, storing them briefly in the memory of the playing device, and delivering them to the player in sequence continues 106, 108, 109, 110, 112 until the final streaming file of the media item is requested, received, and presented 114, 116. During this process, the helper monitors the times between successive requests that it receives from the player and monitors the available bandwidth on the communication channel 117. From this information the helper can determine the difference between the amount of bandwidth of the communication channel being used to serve the requests of the player and the amount of the available bandwidth. This net unused bandwidth can be used by the helper to make supplemental requests 118 to the CDN for streaming files to be used by the helper to provide services to consumers such as the player. The helper can store the streaming files received in response to the supplemental requests in the persistent storage of the playing device (e.g., in the helper's cache). Among other functions, the helper keeps track of each manifest for each quality level (bitrate) separately. The helper also keeps track of video segments, audio segments, and text segments separately, and records different "versions" of the segments together, keeping track of which files of which quality levels are available for each, which is reported to the stream manager to support the caching algorithms.

The services of the helper are provided to the player without the user being required to take any action or to be made aware of the existence or operation of the helper, and typically without the user having any control over or awareness of the process. In general, the services provided by the helper include services that are implemented "behind the scenes" transparently to the user, that is, without the user being aware that they are happening and without the user controlling or participating in the services. The serving of streaming files to the player to improve the quality of presentation is one such service.

One or more of the services provided by the helper can be exposed to the user through a user interface so that the user is aware of their operation, or is able to control or otherwise participate in their operation, or both.

Helper Monitors the Communication Channel and Decides How to Handle the Player's Request As described above, the helper serves a player's request for a streaming file by (a) making a request to the CDN, receiving the requested streaming file on behalf of the player, and storing the streaming file in the cache or briefly in short-term memory, and (b) responding to the player request by sending the requested streaming file from the persistent storage cache or immediately from memory, or some combination of (a) and (b).

In some implementations and as part of this process of serving the player's requests, the helper can monitor the quality of the communication channel. When the communication channel quality is sufficient to carry the requested streaming file (of the requested quality) to the helper, the helper can use approach (a). In the event of a cache miss (e.g., the requested streaming files have not been pre-cached by the helper) the helper requests the missing streaming files from the CDN. If a streaming file or other item specifically requested by the player is already in the helper's cache, the helper may choose to return that item directly from the cache and without making a new request to the CDN. This process is shown in FIG. 6.

In the operation of the technology, if the communication channel quality is low enough or declines significantly enough, the player will recognize the situation by observing a decrease in the fill level of its buffer and a longer delay in receiving requested streaming files or other items and will automatically (according to the adaptive bitrate streaming algorithms) request lower quality streaming files, as it conventionally would have done. Because these player requests for lower quality streaming files are presented to the helper, the helper can monitor the change in the quality parameter for the streaming files that are the subject of the player's requests. When the quality of streaming files requested from the player equals or falls below the quality level of the streaming files stored in the helper's cache, the helper will recognize that the presentation by the player of the media item will be better if the player receives the cached streaming files instead of receiving files that the helper could request directly from the CDN at the current or lower quality level.

Figure 5:
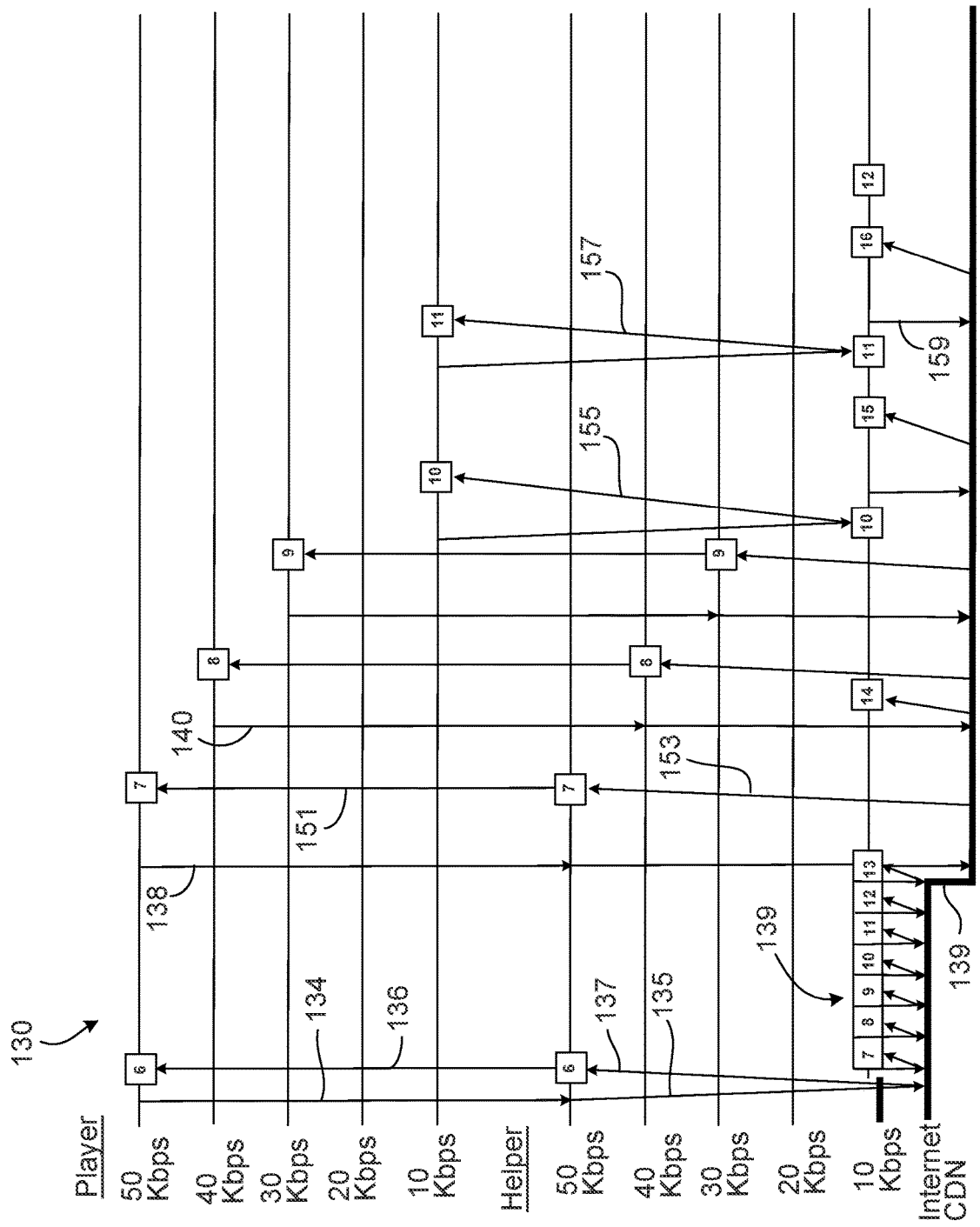
Figure 6:
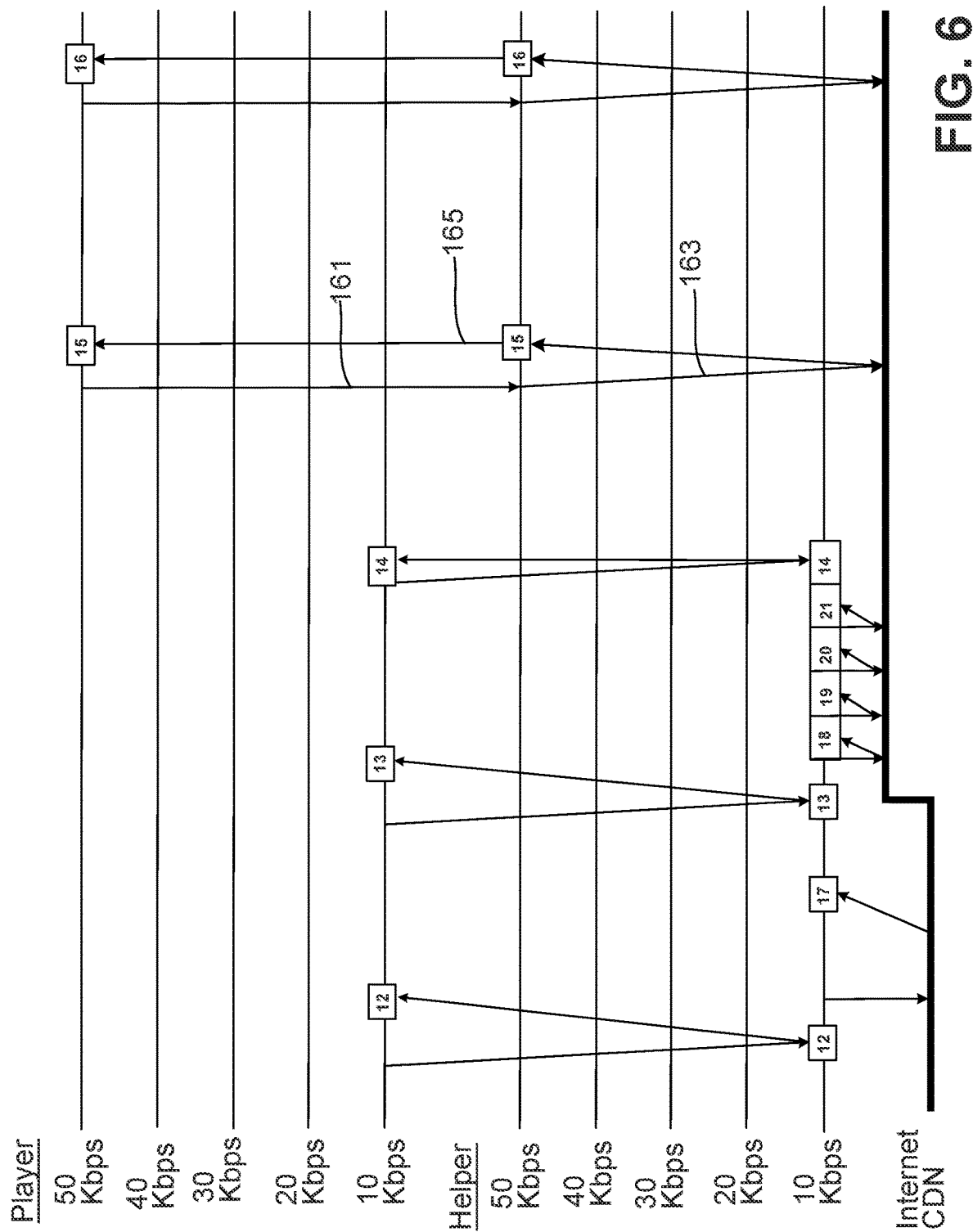

In some implementations, as shown in FIG. 5 and FIG. 6, a process flow 130 is illustrated beginning when a player starts to present a media item (such as a video), through a change in operation after degradation 139 of the quality of the communication channel to the CDN, and back to original operation after the quality of the communication channel returns 141 to its original level. The values shown on the Y-axis represent the quality levels of versions of streaming files expressed in kilobits per second (Kbps), for example, according to typical quality levels provided from a CDN and suitable for adaptive bitrate streaming. Higher numbers represent higher quality files. During a streaming session the quality of the communication channel (also expressed in Kbps) typically must be at least as high (and usually higher) than the Kbps values of the streaming files being delivered through the communication channel. In this example, the player requests 134 a streaming file (for segment 6 of a media item) at a "highest quality" of 50 Kbps. The helper, after requesting 135, receiving 137, and then returning 136 the requested streaming file, quickly interleaves 139 requests for lower quality 10 Kbps streaming files (for segment 7-13) to populate its cache and begins to continually estimate the available communication channel bandwidth as described earlier. The player continues to request 138, 140 streaming files for segment 7 and segments after segment 7 (segments 8 and 9, for example) and they are served 151 by the helper from streaming files received 153 from the CDN and having lower and lower qualities (40 Kbps, then 30 Kbps). The helper continues to populate its cache with 10 Kbps streaming files (e.g., for segments 14, 15, 16, . . . ) received (in an interleaved fashion). As noted, when the communication channel quality degrades 139, the player, starting with segment 7, detects the resulting slower responses and requests streaming files (for segments 7, 8, 9, . . . ) of progressively lower quality levels (40 Kbps, then 30 Kbps). The decline in the requested quality of the streaming files is detected by the helper. The helper also observes the timing intervals of the player's successive requests and the available excess bandwidth on the communication channel that it can use to continue to interleave requests for lower-quality (for example, 10 Kbps) streaming files from the CDN.

The player continues to reduce the quality of the streaming files that it is requesting from the CDN until that quality degrades to the same quality as the streaming files that populate the helper's cache (in the example this occurs for the streaming file for segment 10 at 10 Kbps). At that point, the helper "locks on" to that quality level (10 bps) and begins returning 155 streaming files (e.g., for segments 10, 11, 12 from the helper's cache to the player using a simulated CDN response. The response is simulated in that it appears to the player as if the player is receiving the requested quality streaming files from the CDN when they are actually being provided from the cache. The return of the streaming files of the requested quality is interpreted by the player as representing a corresponding quality of the communication channel to the CDN which causes the player to continue requesting streaming files at the cached quality level. For example, if the player continues to receive 10 Kbps streaming files from the helper, the player assumes that the communication channel quality is at least 10 Kbps. While the helper continues to return 157 cached streaming files for these segments, it continues to interleave requests 159 for streaming files from the CDN (e.g., for segments 15, 16, and 17) to store at the end of the cache. The purpose of this activity is not only to keep the cache populated, but also to identify when the available bandwidth of the communication channel has increased sufficiently to allow the player to again take over normal control of the quality level of the streaming files being requested. When that happens, the helper will again serve the requests 161 of the player by making requests 163 to the CDN and sending 165 the received streaming files directly to the player.

Therefore, the helper can choose to respond to the player requests by providing streaming files from the helper cache or from the CDN, as appropriate or desirable. In effect, the helper operates to set a minimum quality level of streaming files for operation of the player (by filling in when the quality available through the communication channel may fall below the minimum) and allows the player itself to request essentially directly from the CDN and manage streaming files of a higher quality level when higher quality level streaming files can be handled by the current quality of the communication channel.

In some cases, the cached streaming files delivered by the helper to the player are not of higher quality than the minimum because the best that can be done by the helper is to store the lowest quality streaming files and deliver those to the player. This approach improves the presentation because the player has not been required to halt or slow the presentation to the user to allow for re-buffering of streaming files.

In some implementations, while the helper is delivering cached streaming files to the player, the helper will continue to monitor the communication channel quality for improvement and will cause the player to increase the quality level of the streaming files it requests when the improvement in communication channel quality is sufficient for the player to receive streaming files of the higher quality through the communication channel, as shown in FIG. 6. The helper, being aware of the improvement in quality of the communication channel, induces the player to request a higher quality starting with the streaming file for segment 15.

Figure 7:
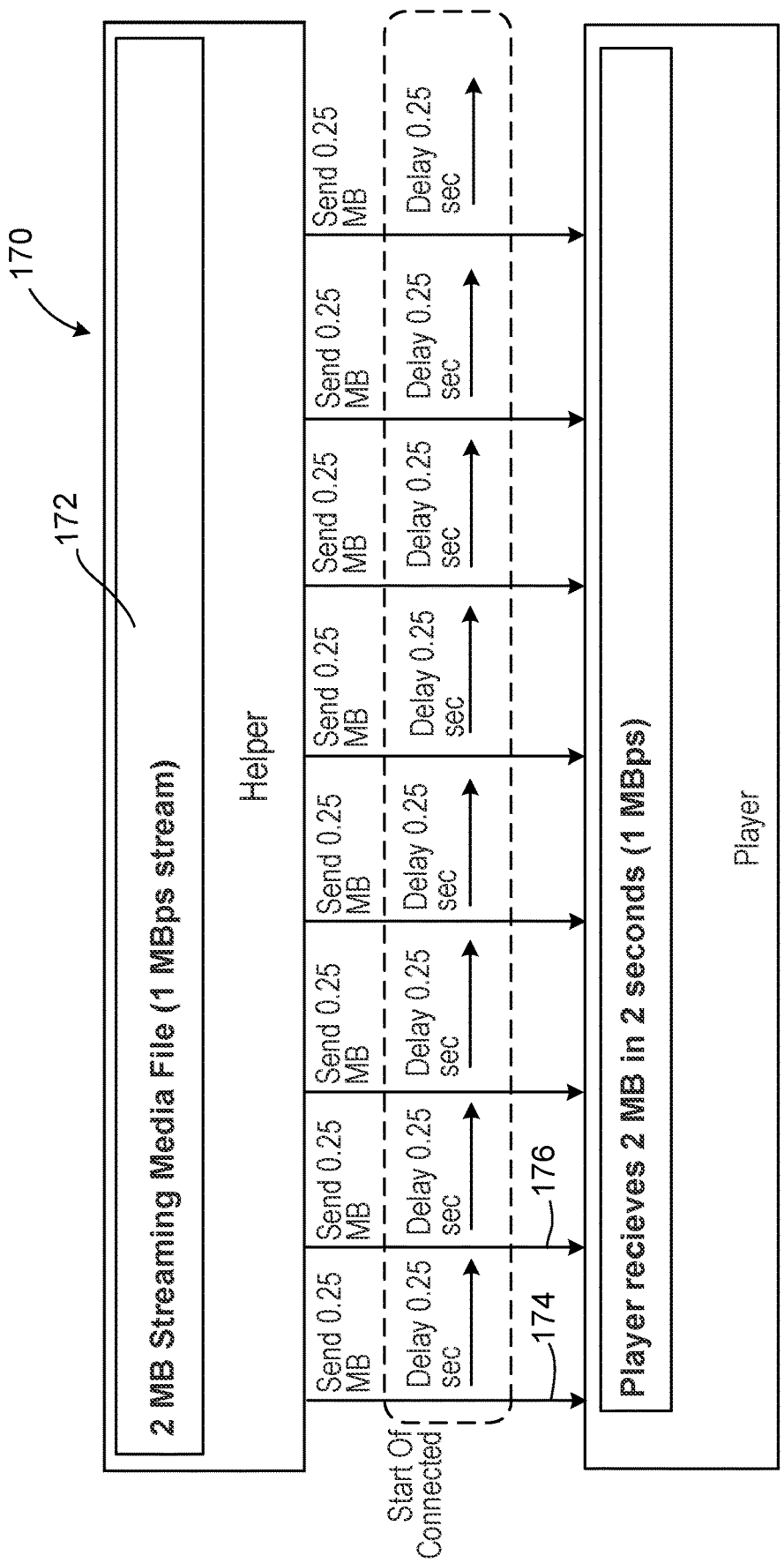

As shown in FIG. 7, the helper can cause the player to increase the quality level of its requests by the helper implementing a "virtual communication channel" behavior 170. The helper in effect sets a minimum streaming file quality level for operation of the player as explained earlier. to achieve this result, the helper delivers each cached streaming file 172 to the player more slowly than necessary to cause the player to think (incorrectly) that the communication channel quality is not sufficient for the player to request streaming files of a higher quality level. In the example shown in FIG. 7, a 2 MB streaming file 172 is to be sent to the player at a rate of 1 Mbps (even though the actual rate at which the helper could deliver the file, given the quality of the communication channel would be 2 Mbps). For this purpose, the 2 MB streaming file is delivered as eight pieces (each of a size of 0.25 MB). The helper begins to send the first piece at time 174. Even though the helper would be able to send the second piece sooner, the helper delays the start of the sending of the second piece by 0.25 seconds until time 176. As a result, the complete 2 MB streaming file takes 2 seconds to deliver, implying a communication channel rate of 1 Mbps.

Conversely when the helper intends for the player to request streaming files of a higher quality (such as for segment 15 in the example of FIG. 6), the helper delivers the requested cached streaming files more quickly to implicitly inform the player that the communication channel has enough quality to move up to higher qualities of streaming files. The streaming files can be delivered at a speed corresponding to a specific quality of the communication channel to trigger a particular small increase in requested quality of the streaming files or as fast as possible to trigger a larger increase. In other words, the helper can control increases or decreases in the streaming file quality level of the requests being made by the player by simulating a virtual communication channel to the player that has available quality that is either higher or lower than the quality level currently being requested by the player.

In situations in which the available bandwidth on the communication channel reliably (e.g., most of the time) exceeds the bandwidth required to serve the highest quality versions of the streaming files being requested by the player, then the helper may request and store streaming files of the highest quality.

Therefore, this process by which the helper improves the quality of the presentation by the player of the media item is executed without disrupting the player's ability to sometimes provide the highest quality presentation of the media item that it is capable of providing using the available communication channel bandwidth to the CDN and without needing to use the streaming files stored in the helper cache. In other words, the player is allowed to proceed in the normal way under the adaptive bitrate streaming algorithms, except that the player's requests are handled by the helper rather than being sent directly to the CDN.

Thus, a key role of the helper can be to monitor the quality level of requested streaming files from the player and the real time communication channel quality, and to either allow the player to operate normally (and in accordance with the technique described above) in its requests directly to the CDN, or to provide locally cached streaming files to the player depending on the current circumstances.

One advantage of the process implemented by the helper is in enabling the presentation of a media item without interruption or quality degradation caused by buffering processes or pauses at the player due to short-term fluctuations in the communication channel quality.

The technology delivers streaming files requested by the player from a locally stored version sometimes eliminating the need for a streaming file to traverse the "last mile" from the CDN too near to the time when it must be presented to the user, for example. In other words, the streaming file has already traversed the last mile when it was received and stored in the persistent storage by the helper and is ready immediately when the player requests it.

The user's overall experience is, at worst, no different from a conventional streaming media experience and is, at best, a completely uninterrupted streaming presentation of a high quality video or other media item. In no event does the helper harm or worsen the streaming media performance inherent to standard adaptive bitrate streaming.

Populating the Persistent Storage Cache

In addition to the monitoring of the player requests described above to determine how to respond to requests, the helper also continually engages in another monitoring process designed to enable it to request and store streaming files during the same time when the player is presenting a media item, in order to keep its persistent cache populated.

As part of this other monitoring process, the helper calculates a rate at which the player is requesting successive streaming files and the sizes (e.g., quality) of the streaming files. The rate of requests and the sizes of the streaming files are measures of the demand that the player is placing on available bandwidth of the communication channel. The helper also uses speed tests in real time to determine the available bandwidth of the communication channel. These two measures enable the helper to identify the available bandwidth on the network and the bandwidth and timing required by the player for streaming files. This, in turn, indicates the availability of bandwidth on the communication channel in conjunction with the player's requests during which the helper can request and store streaming files to establish one or more backup sets of streaming files of a chosen quality level or levels. The backup set can be made available to the player if channel quality declines, for example, if available bandwidth declines or connectivity is lost altogether.

In some cases, the helper is able to change its choice of quality level of the streaming files of the backstop set dynamically during the process of requesting and storing the backup set, as the amount of available bandwidth on the communication channel fluctuates, as shown in FIG. 9. In this case, the helper is able to request 140 higher quality (e.g., 20 Kbps) streaming files for segments 14-16 due to an increase in available bandwidth. If the bandwidth availability decreases again, the helper can request 142 lower quality segments (such as for segments 17-23).

If the communication channel quality declines temporarily, the helper can respond to requests from the player using stored streaming files in the backup set. While the helper is providing the streaming files from the backup set in the helper's persistent cache, the helper also continues to monitor the bandwidth of the communication channel to determine if and when the communication channel has returned to a level at which the player can resume its normal use of streaming files requested by the helper directly from the CDN.

As noted earlier, the helper is designed so that, at times when it is the streaming files of the cached backup set that the helper is providing in response to requests of the player, the streaming files are provided at a simulated rate appropriate to the cached streaming files and at a rate that will not influence the player's choice of quality levels. This approach assures that the player will not be caused to increase the quality of streaming files that it is requesting from the helper's cache before the quality of the communication channel is restored. Once the communication channel quality has recovered sufficiently, the helper returns the player to the normal operation of the adaptive streaming rate algorithm.

Note that the process described above does increase the amount of communication channel resources being used by the playing device in order to provide the backup set. In some cases this is because the playing device will effectively be requesting and storing between one and up to a maximum of two copies of the streaming files for the media item, namely the streaming files requested by the player and the backstop set requested by the helper. This extra use of storage could be configurable, however, by selecting a desired value for the minimum quality level targeted by the helper. Using the lowest quality level, for instance, would result in a much smaller additional use of space than forcing a higher quality level.

In any mode in which the helper is engaged with a consumer and is responding to requests of the consumer by serving streaming files, the helper is able to engage in monitoring activities associated with the player. For example, the helper can observe the player's network profile, which includes the pattern, timing, and quality levels of the requests made by the player, and, based on it, make decisions about what additional content to download to the helper cache. For instance, the helper may determine that there is more than enough available bandwidth to fill the cache with the minimum quality level and choose, when possible, to cache a higher quality level, up to a configured maximum. An example of this is shown in FIG. 8, in which, while serving 50 Kbps streaming files to the player, the helper can choose to request, for storage in its cache, segments 7 through 13 at a 10 Kbps quality, then segments 14 through 16 at a 20 Kbps quality, and then return to requesting segments 17 through 23 at a 10 Kbps quality.

Figure 8:
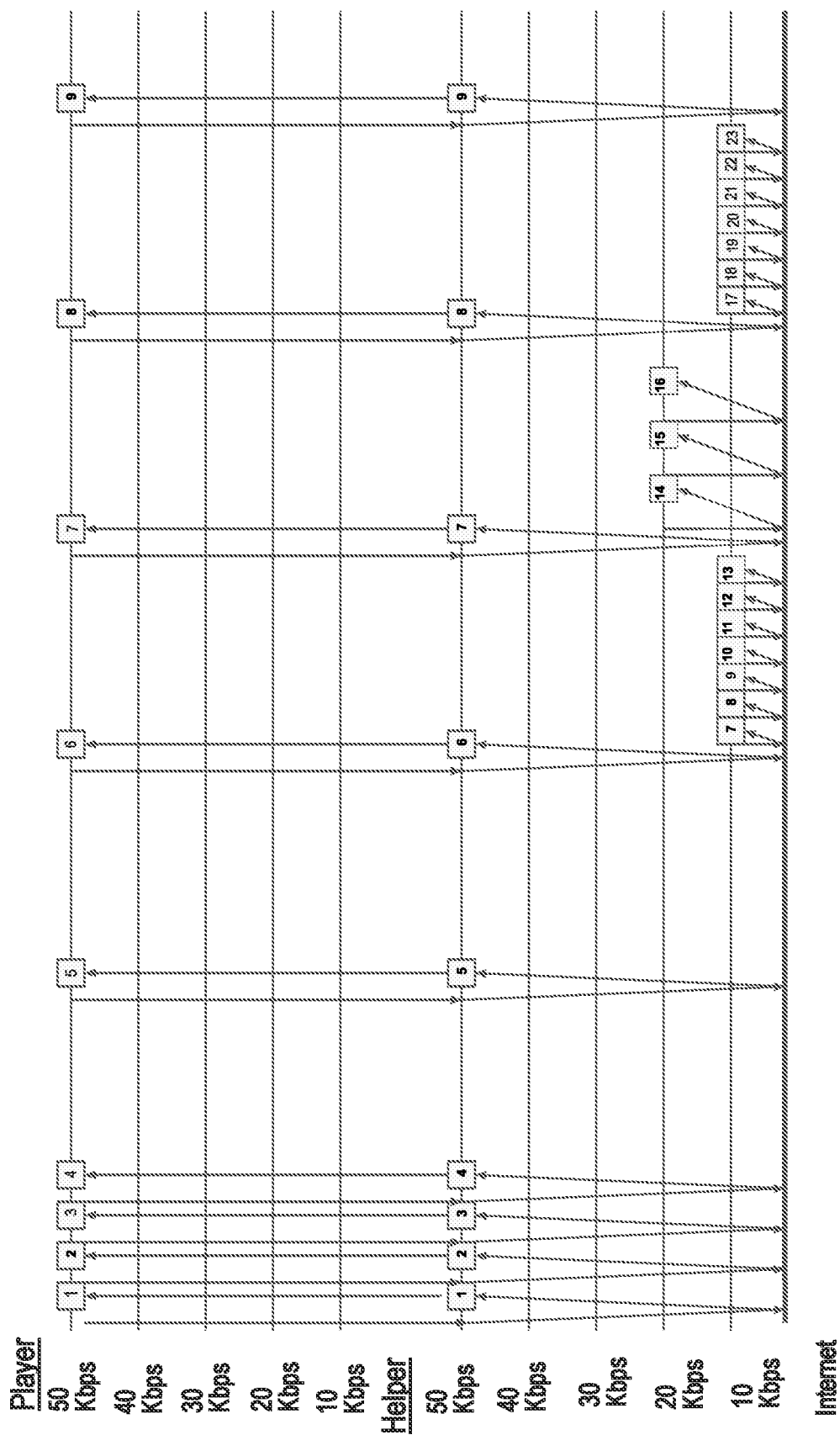
Figure 9:
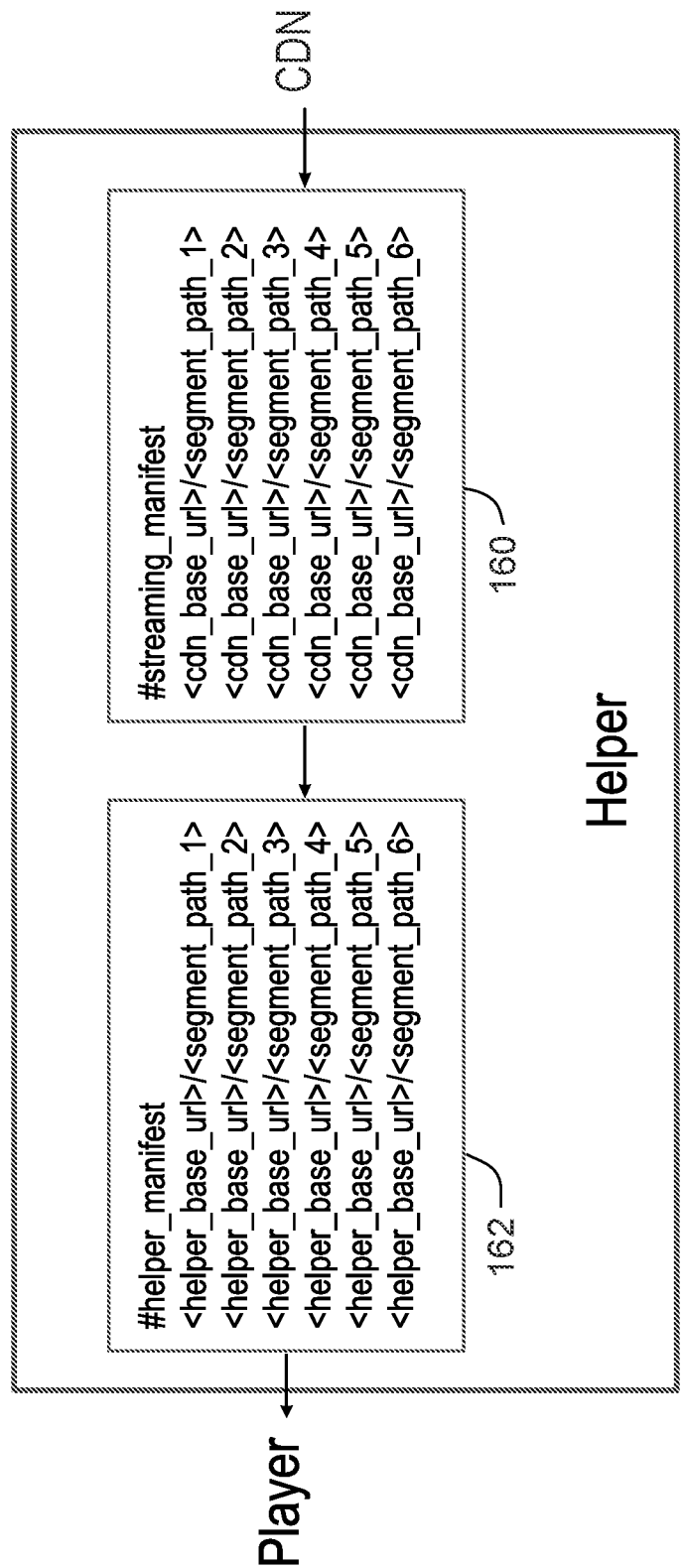

FIG. 8 shows an example of the capability of the helper to choose a quality level for the streaming files at a given time and to implicitly induce the player to request streaming files of that quality level and use them in presenting the media item to the user. For streaming files for segments Once a presentation of a media item has been completed (or aborted), the helper can apply a configurable policy to govern whether it will automatically clear the contents of the helper's cache or preserve the cache content for that item for later use, for example, in future presentations of the media item.

Other Functions and Use Cases of the Helper

Revising the Manifest to Provide Helper Services

To support its services, the helper can, among other things, use the manifest to request, receive, store, and maintain streaming files for the media item in the long-term storage cache.

Some of the helper's services can involve providing responses to requests for streaming files from the player. When the player first requests a media item from the helper, the helper requests and receives the manifest for the media item through the communication channel, for example, from the CDN. As shown in FIG. 9, the helper translates the manifest 160 received from the CDN into a revised manifest 162 in which the metadata indicating the locations of the streaming files are altered so that the requests from the player will be directed to the helper rather than to the CDN. The revised manifest is provided to and stored by the player in the short-term memory.

When a request for a streaming file is received from the player, and the helper determines not to provide the streaming file from the helper's cache, the helper uses the metadata in the original manifest to request and receive the streaming file from the CDN on behalf of the player. At the same time, the helper can request and receive additional streaming files that are forward of the file requested by the player (that is, appear later) in the media item.

Download and Serve Now; Download and Serve Later

In some examples, which we call "download and serve now", while a media item is being presented to a user by the player, the helper can be downloading and storing streaming files that the player will be consuming longer into the future than would be the case for a streaming mode in which the streaming files are requested directly through the communication network from the CDN as needed. For instance, if the user chooses to continue watching a 30-minute TV show starting at 7 minutes into the show, the helper may be requesting and storing the remainder of that show beginning at 7 minutes into the media item. Then, if necessary or desirable, when the player reaches, say, the 10-minute point in the media item, the helper can supply the relevant sequence of streaming files requested by the player from the helper's cache. In some cases, the helper can request and store streaming files of a highest quality for the rest of the media item.

The same feature in which the helper serves persistently stored streaming files to the player can also be used to serve one or more other consumers installed and running on the playing device for a variety of purposes.

In some cases, which we call "download and serve later", the helper requests streaming files, stores them persistently, and serves them to a consumer after a more substantial delay, for example, an hour, a day, or a week later. Download and serve later could be used for a slate of ads provided from the CDN and held on the playing device until used later.

In general, some applications of the helper designed to serve the player involve delivering streaming files during (or shortly before) the period when the media item is being presented by the player.

Some uses of the helper to serve the player involve delivering streaming files later than the period when the media item is first being presented by the player.

Comparison of the Helper to a Web Cache or Proxy

The helper cache and the helper could be considered similar to a Web cache and a Web proxy operated on a CDN or other distribution server in that the helper acquires streaming files for future use based on algorithms designed to understand which streaming files will be needed by a player. The helper operates between a consumer (application, playing device, other device) and a producer (streaming media server, origin server, application server, CDN). The helper and a Web proxy both intercept and process player requests as middle men in the network flow of files. Yet there are significant differences.

Typical Web proxies and caches are designed to help on secondary requests after a first (primary) request for a streaming file has been served. By contrast, the helper can be designed to anticipate the first request before it is issued and therefore to help with the initial and immediate presentation of the media item.

A Web proxy is typically used to manage traffic, not to assist in requests. For example, a Web proxy can monitor for requests that should be disallowed (e.g., Web proxies in the form of ad blockers, parental content controls, and others). The helper uses the initial requests to anticipate future requests, rather than choosing how to handle the initial requests. An important function of the helper is to improve performance of delivery of streaming files or other media data from a producer to a consumer.

Also, unlike a Web proxy and Web cache, the helper is not configured to improve transfer times for subsequent requests for files made by multiple end users from a common cache. The helper improves the presentation of media items by anticipating initial requests a player will make in a manner that is customized for a single device or multiple devices of a single user or within a single home or for a single account. Unlike a typical Web proxy, the helper also is not necessarily designed to filter requests for files (such as is typical in ad blockers and parental content filters). The helper can use its position between the player and the CDN to observe, anticipate, and act on future requests in service of better presentation of future segments of the media item.

The helper is configured to make the responses to the consumer's first request on the playing device more efficient or effective rather than aiming to improve the responses to the second or third requests (as is the case for some Web caches or proxies). For example, the helper does not wait for a cache miss before fetching and storing streaming files, but may proactively initiate the fetching and storing of streaming files.

The helper also can alleviate degradation caused in the last mile delivery over poor quality communication channels hosted by fixed-line networks, wireless networks, and WiFi networks. A Web proxy at the CDN cannot address the degradation because it relies on such communication channels for the last mile delivery.

In addition, the helper uses traditionally unmanaged storage within the playing device (mobile or home-based), which carries different cost (lower) and availability (higher) compared to a traditional web cache.

Seamless, Reliable Client-Side and Server-Side Ad Insertion

Typically, in client-side ad insertion, an ad player, separate from the main player, is launched on the playing device to acquire and present ads associated with media items being presented by the main player. One benefit of this approach is in ensuring that the main player does not lose (to make room for the ads) the streaming files held in the buffer for the media item being presented to the user. The main player may know the locations where it can fetch the streaming files for the ads ahead of the times when they are needed, but the streaming files for the ads are not requested and delivered to the ad player until shortly before the main player reaches the ad insertion point. Because the streaming files for the ad are delivered shortly before they will be presented, there is a risk that the request and delivery can take too much time and that the ad will fail to be presented properly or will not be available for presentation.

By contrast, the helper can use the manifest to peek ahead in the sequence of streaming files for the media item to identify the locations of the ad insertion points and the URLs for the ads and can download the upcoming ads from the CDN to persistent local storage. This peek ahead technique assures that the streaming files for the ads will be available as needed by the player.

When the main player requests the ad location, the helper will point the player to the streaming files for the ad already previously downloaded to the helper and stored on the playing device. The ad will therefore be available to be presented without delay and without the risk of non-delivery caused by low quality of the communication channel. In such examples, the helper provides a local cache of both the streaming files of the media item and the streaming files of the ads that result from the ad decisions.

At a configurable time, either before presentation of the media item begins or at a desired time during presentation, the helper calls to the ad server on behalf of the player. The helper then caches the response (that is, the URL for the ad), other metadata about the ad, and the streaming files for the ad. Later the player can request streaming files for the ads that were received from the ad server and stored, by providing its requests to the helper. Based on internal logic of the helper, the helper may return the cached ad response (in response to requests for URLs redirected to the helper for servicing) or can send corresponding requests to those from the player to the ad server on the communication network.

This workflow for making ads available to the player in response to ad requests is executed by the helper transparently to both the player and the ad player, and the ad server is unaware that the requests for ads are not coming from the player.

In some instances, the helper will not have enough time to peek ahead as described above. For example, the streaming files for a pre-roll ad (that is, an ad that is to be presented before the start of the media item) must be delivered immediately after the user presses "play" to start the media item. In some cases, an ad request to the ad server associated with any ad insertion point in the media item could fail, which typically would result in a missed advertising opportunity and a frustrating user experience. In such cases, the streaming files for one or more other ads that have been pre-stored prior to and without regard to the presentation of a particular media item can be used. The ads could be default ads or house ads (promoting the supplier of media items) which are pre-stored by the helper. These supplemental ads can be chosen to be appropriate for presentation with any media item. The streaming files for the supplemental ads are available to be served by the helper immediately as a pre-roll ad or as a back-up if the streaming presentation of the media item experiences an ad request failure.

The technology could also be used to aid server-side ad insertion. Typically, when an ad is inserted into the manifest by server-side ad insertion, the ad streaming files are of a different bitrate than the bitrate of the streaming files of the main media item. This results in a discontinuity in presentation as the player must abandon its knowledge of previous bitrates and work out how to buffer the streaming files of the ad. Once the ad ends, the player must again abandon its knowledge of previous bitrates and re-buffer for presentation of the streaming files of the main media item. In some cases, the helper could eliminate the discontinuous presentation, for example, by forward-buffering and performing the adjustment for changing bitrates ahead of the time when the player requests the ad streaming files.

Trick Mode for Live Stream

Trick mode features can be provided by the helper for the playing device directly from the locally stored streaming files.

When a media item is being delivered live in real-time from the CDN to the playing device, for example, trick mode features (rewind, fast forward, or pause) normally are not available to the user unless the CDN maintains on behalf of the playing device a server-based DVR that stores streaming files of the live media item and provides a time-shift buffer.

Most over the top (OTT) streaming services for media items do not host such a trick mode feature because of its cost. In any case, server-based trick mode features can introduce delay and re-buffering.

To illustrate the value of trick mode features, imagine you are watching a football game (from an OTT service) and your team is about to kick a field goal. You need to put down your playing device for a few minutes, but don't want to miss anything. You can stop the live media stream presentation, but when you restart it in 5 minutes, the playing device reconnects to the server to reestablish the live media stream, but the 5 minutes in the interim are gone, and you missed the field goal attempt.

To overcome this scenario, in some implementations, the helper receives and stores streaming files as they are being delivered to the playing device during a live media streaming session. The streaming files are stored in a cache on the playing device. The cache could have a configurable cache size (e.g., a size to store 30 minutes of streaming files). In the football game example, if you paused the session before the field goal, the helper would continue to acquire and store the streaming files from the live media stream. When you press play again, the helper would present streaming files beginning at the point in the media item (the game program) where you previously pressed pause (before the field goal). The helper would then play the video of the field goal and continue to present the streaming files with a delay of 5 minutes relative to the streaming files of the live media item. The helper would continue to store the streaming files for the media item as they are delivered live to the playing device from the CDN, 5 minutes in the future, and you could choose to fast forward to real time if you desire. The helper can retain the cache for the live media item so that you can also rewind and watch the field goal again for as long as it remains in the stored cache.

Eliminate Re-Buffering

During a normal on-demand presentation (that is, a presentation not occurring live in real time) of the streaming files of a media item, the player builds up a buffer of streaming files to assure a supply of available streaming files should the quality of the communication channel degrade and impede temporarily the ability of the player to acquire needed streaming files. The presentation of the media item uses streaming files drawn from the buffer. Providers of media items use adaptive bitrate streaming protocols and deliver streaming files to the buffer of a varying quality that depends on the quality of the communication channel. Higher bitrate versions of streaming files are of higher quality but are larger requiring a higher quality communication channel to deliver the streaming files fast enough to keep up with the rate at which the player needs them. Lower bitrate versions have lower media quality, but can be delivered quickly. Adaptive bitrates are aimed at assuring the buffer of the player never runs out of streaming files regardless of the quality of the communication channel. If the buffer becomes empty, the streaming files must be reloaded in a process called re-buffering which interrupts the smooth presentation of the media item. Re-buffering frustrates users and may cause them to stop watching. Despite adaptive bitrate streaming, re-buffering may still be required when the quality of the communication channel changes rapidly so that periodically the playing device cannot prevent the buffer from emptying even by acquiring the lowest bitrate versions of the streaming files for the media item.

The emptying of the buffer and the need for re-buffering can be reduced or avoided by the helper rapidly downloading and storing streaming files ahead of the time of presentation of a current streaming file. The helper can store streaming files for a longer period than the normal playing device buffer. And the requests and storage of streaming files by the helper does not interfere with the normal requests and receipt of streaming files by the player used to populate the normal player buffer for the media item. As described earlier, the helper can use the intervals (pauses) between the player's requests for streaming files to acquire streaming files and store them in the helper's buffer.

In some instances, the helper can be configured to request and store versions of streaming files for any desired adaptive bitrate quality or any desired combination of streaming file qualities depending on communication channel quality, media analytics, or other rules. When the player experiences communication channel degradation that forces it to downgrade the quality of the streaming files below a desired minimum quality level, or that would trigger re-buffering, or both, the player's requests for are served from the helper's cache of the helper so that re-buffering and further media quality degradation can be reduced or avoided. Once communication channel conditions improve, the helper will request the streaming files from the CDN on behalf of the player, to acquire a higher bitrate version of the streaming files.

In some cases, the helper can request two different versions of a given streaming file and store one or the other or both of them in the persistent storage of the playing device. For example, the two versions could be a lower quality backstop and a higher quality version which is available when the communication channel is of high quality. In some cases, the helper may have requested both versions, stored only the low quality back stop and forwarded the higher quality version to the player buffer.

In some instances, the helper could continue to store the higher quality version rather than the lower quality version because it has already requested and received the high quality version and may have use for it later. In some examples, the helper could continue to store both versions and then deliver the version having the quality closest to the previously playing quality level which may reduce frequent rapid jumps in perceptible quality of the presentation.

The requesting and storing of more than one version of streaming files should be implemented in a way that balances the value of the stored streaming files with the increase in cost of data transmission on the communication channel, for example, on data-limited cellular plans.

One strategy for the helper to decide on a quality level to request is to apply the quality level that the player is using and attempt to download streaming files of that quality as fast and as far forward as possible. This strategy would be possible under fewer communication channel conditions (generally only when there's a larger bandwidth available on the communication channel than the maximum bandwidth of streaming files identified in the manifest file), but would provide an excellent experience for the user by handling reductions in communication channel quality and temporary losses of connectivity well. Another strategy would be for the helper only to request streaming files of the established minimum quality (which could be the lowest) backstop quality level. In some examples, the minimum quality could be the lowest quality, or could be the highest quality, or could be any quality in between (or varying).

In some implementations, the helper could choose which quality levels of versions of streaming files to continue to store.

An example of why the helper might continue to store higher quality versions and not continue to store lower quality versions in the persistent storage would be in situations where the helper is expected to provide trick-mode functions. The lower quality versions may have been stored ahead of time for reasons discussed earlier. When the higher quality versions are received from the CDN, the helper may store the high quality versions (and discard the lower quality versions), then later use the higher quality versions to populate a backwards buffer to provide a rewind function.

Other implementations are also within the scope of the following claims.

The invention claimed is:

1. A method comprising:
    a helper receiving from a player a first request for a first particular segment of a media item, wherein the media item comprises a first segment group (S1) comprising a first ordered set of N segments $S1_1$ to $S1_N$ and a second segment group (S2) comprising a second ordered set of N segments $S2_1$ to $S2_N$, and the first particular segment is segment $S1_i$, where i>0 and i≤N; and
    as a result of receiving the request for the first particular segment, the helper performing a cache building process that comprises:
    the helper transmitting to the server a second request for a second particular segment of the media item, wherein the second particular segment is either segment $S1_{i+j}$ or $S2_{i+j}$ where j≥2 and j≤(N−i);
    the helper receiving the second particular segment from the server; and
    the helper storing in a local cache the second particular segment after receiving the second particular segment from the server.

2. The method of claim 1, further comprising:
    after storing the second particular segment in the local cache, the helper receiving from the player a second request, wherein the second request is a request for the second particular segment; and
    the helper, in response to receiving from the player the second request for the second particular segment, retrieving the second particular segment from the local cache and providing the second particular segment to the player.

3. The method of claim 1, further comprising:
    after storing the second particular segment in the local cache, the helper receiving from the player a second request, wherein the second request is a request for a third particular segment comprising the same media content as the second particular segment, but having a different segment quality level than the second particular segment; and
    the helper, in response to receiving from the player the request for the third particular segment, retrieving the second particular segment from the local cache and providing the second particular segment to the player.

4. The method of claim 1, further comprising:
    as a result of receiving the first request for the first particular segment, the helper transmitting to a server a request for the first particular segment;
    the helper receiving the first segment from the server; and
    the helper providing the first segment to the player after receiving the first segment from the server.

5. The method of claim 1, wherein the cache building process further comprises, prior to transmitting to the server the request for the second particular segment of the media item, the helper selecting a segment quality level, wherein second particular segment of the media item has a quality level equal to the selected segment quality level.

6. The method of claim 5, wherein selecting the segment quality level comprises selecting the segment quality level based on a determined quality of a communication channel that is used to receive the second particular segment.

7. The method of claim 1, further comprising, prior to receiving the request for the first particular segment:
    the helper receiving, from e media player, a request for a manifest file for the media item;
    the helper transmitting a request for the manifest file;
    the helper receiving the manifest file;
    the helper modifying the received manifest file to produce a modified manifest file; and
    the helper responding to the request from the media player for the manifest file by providing to the media player the modified manifest file.

8. The method of claim 7, wherein the modified manifest file instruct the media player to send all segment requests to the helper.

9. The method of claim 1, wherein the cache building process further comprises, prior to transmitting to the server the request for the second particular segment of the media item, the helper determining that the second particular segment is a first segment of an advertisement.

10. The method of claim 9, wherein the cache building process further comprises:
the helper determining that a third particular segment is a second segment of the advertisement;
the helper transmitting to the server a request for the third particular segment of the media item, wherein the third particular segment is either segment $S1_{i+j+1}$ or $S2_{i+j+1}$;
the helper receiving the third particular segment from the server;
the helper storing in the local cache the third particular segment after receiving the third particular segment from the server.

11. An apparatus, the apparatus comprising:
memory storing instructions for implementing a helper; and
processing circuitry for executing the instructions, wherein the helper is configured to:
receive from a player a first request for a first particular segment of a media item, wherein the media item comprises a first segment group (S1) comprising a first ordered set of N segments $S1_1$ to $S1_N$ and a second segment group (S2) comprising a second ordered set of N segments $S2_1$ to $S2_N$, and the first particular segment is segment $S1_i$, where $i>0$ and $i \leq N$; and
as a result of receiving the request for the first particular segment, perform a cache building process that comprises:
transmitting to the server a second request for a second particular segment of the media item, wherein the second particular segment is either segment $S1_{i+j}$ or $S2_{i+j}$, where $j \geq 2$ and $j \leq (N-i)$;
receiving the second particular segment from the server; and
storing in a local cache the second particular segment after receiving the second particular segment from the server.

12. The apparatus of claim 11, wherein the helper is further configured to:
in response to receiving from the player a request for the third particular segment, retrieving the second particular segment from the local cache and providing the second particular segment to the player, wherein
the third particular segment comprises the same media content as the second particular segment, but the third particular segment has a different segment quality level than the second particular segment.

13. The apparatus of claim 11, wherein
the cache building process further comprises, prior to transmitting to the server the request for the second particular segment of the media item, the helper selecting a segment quality level, wherein second particular segment of the media item has a quality level equal to the selected segment quality level, and
selecting the segment quality level comprises selecting the segment quality level based on a determined quality of a communication channel that is used to receive the second particular segment.

14. The apparatus of claim 11, wherein the helper is further configured to:
transmit a request for a manifest file for the media item in response to receiving, from the media player, a request for the manifest file for the media item;
after receiving the manifest file, modify the received manifest file to produce a modified manifest file; and
respond to the request from the media player for the manifest file by providing to the media player the modified manifest file, wherein
the modified manifest file instruct the media player to send all segment requests to the helper.

15. The apparatus of claim 11, wherein the cache building process further comprises, prior to transmitting to the server the request for the second particular segment of the media item, the helper determining that the second particular segment is a first segment of an advertisement.

16. The method of claim 15, wherein the cache building process further comprises:
the helper determining that a third particular segment is a second segment of the advertisement;
the helper transmitting to the server a request for the third particular segment of the media item, wherein the third particular segment is either segment $S1_{i+j+1}$ or $S2_{i+j+1}$;
the helper receiving the third particular segment from the server;
the helper storing in the local cache the third particular segment after receiving the third particular segment from the server.

* * * * *